United States Patent
Qian et al.

(10) Patent No.: US 12,206,625 B2
(45) Date of Patent: Jan. 21, 2025

(54) METHOD, TERMINAL DEVICE, BASE STATION, COMPUTER READABLE MEDIUM FOR MEASURING CROSS-LINK INTERFERENCE, AND METHODS AND APPARATUSES FOR RANDOM ACCESS PREAMBLE ALLOCATION, DETERMINATION, AND DATA TRANSMISSION

(71) Applicant: SAMSUNG ELECTRONICS CO., LTD., Suwon-si (KR)

(72) Inventors: Chen Qian, Beijing (CN); Peng Lin, Beijing (CN); Chuang Zhang, Beijing (CN); Di Su, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/817,958

(22) Filed: Aug. 5, 2022

(65) Prior Publication Data
US 2022/0385439 A1 Dec. 1, 2022

Related U.S. Application Data

(62) Division of application No. 16/792,024, filed on Feb. 14, 2020, now Pat. No. 11,411,664.

(30) Foreign Application Priority Data

Feb. 14, 2019 (CN) .......................... 201910116881.6
Jun. 13, 2019 (CN) .......................... 201910510150.X

(51) Int. Cl.
*H04W 74/0833* (2024.01)
*H04B 17/318* (2015.01)
(Continued)

(52) U.S. Cl.
CPC ......... *H04L 5/0094* (2013.01); *H04B 17/318* (2015.01); *H04B 17/336* (2015.01);
(Continued)

(58) Field of Classification Search
CPC ................. H04L 5/0094; H04L 5/0007; H04L 27/26025; H04L 27/2605; H04L 27/2613;
(Continued)

(56) References Cited

U.S. PATENT DOCUMENTS

2014/0211606 A1* 7/2014 Bergman ............... H04W 36/08
370/217
2018/0131481 A1 5/2018 Jiang et al.
(Continued)

FOREIGN PATENT DOCUMENTS

EP 3567759 A1 11/2019
WO 2018/128297 A1 7/2018
(Continued)

OTHER PUBLICATIONS

Qualcomm Incorporated, "Dynamic TDD UE to UE measurement considerations", 3GPP TSG RAN WG1 Meeting NR#3, Sep. 18-21, 2017, R1-1716449, 4 pages.
(Continued)

*Primary Examiner* — Peter P Chau

(57) ABSTRACT

A terminal device and a method for measuring cross-link interference. The method includes receiving time-frequency resource configuration information from a base station, wherein the time-frequency resource configuration information includes configuration information of measurement time-frequency resources for measuring the cross-link interference. The method also includes determining measurement time-frequency resources for measuring the cross-link interference according to the time-frequency resource configuration information. The method further includes mea-
(Continued)

---

S1910 — Determining whether an interference strength between adjacent cells is greater than a strength threshold S1920 — When the interference strength is greater than the strength hreshold, allocating, for each of the adjacent cells, an identical ZC sequence length, an identical cyclic shift interval, an identical logical root sequence number, and different and continuous random access preamble set index numbers, wherein the ZC sequence length, the cyclic shift interval, the logical root sequence number, and the random access preamble set index number are configured to determine an available random access preamble set of the each of the adjacent cells, and the random access preamble generated from the identical logical root sequence number exists in the random access preamble set corresponding to at least two continuous random access preamble set index numbers suring the cross-link interference on the measured time-frequency resources and feeding back the measurement result of the cross-link interference to the base station.

17 Claims, 21 Drawing Sheets

(51) Int. Cl.
    *H04B 17/336*     (2015.01)
    *H04L 5/00*     (2006.01)
    *H04L 27/26*     (2006.01)
    *H04W 24/08*     (2009.01)

(52) U.S. Cl.
    CPC ...... *H04L 5/0007* (2013.01); *H04L 27/26025* (2021.01); *H04L 27/2605* (2013.01); *H04L 27/2613* (2013.01); *H04W 24/08* (2013.01); *H04W 74/0833* (2013.01); *H04L 5/005* (2013.01)

(58) Field of Classification Search
    CPC ..... H04L 5/005; H04L 5/0057; H04L 5/1461; H04L 5/1469; H04L 27/2607; H04L 5/0062; H04L 5/0073; H04L 5/0005; H04L 5/0028; H04L 5/0048; H04B 17/318; H04B 17/336; H04B 17/24; H04B 17/345; H04W 24/08; H04W 74/0833; H04J 11/0023; H04J 13/0062
    See application file for complete search history.

(56) References Cited

U.S. PATENT DOCUMENTS

| | | | |
|---|---|---|---|
| 2019/0191464 A1* | 6/2019 | Loehr | H04W 74/0833 |
| 2019/0215864 A1* | 7/2019 | Yang | H04W 74/02 |
| 2019/0260486 A1 | 8/2019 | Kang et al. | |
| 2019/0274155 A1 | 9/2019 | Bhattad et al. | |
| 2020/0037370 A1* | 1/2020 | Han | H04W 24/04 |
| 2020/0067612 A1 | 2/2020 | Wu et al. | |
| 2020/0177291 A1 | 6/2020 | Fei et al. | |
| 2020/0252975 A1* | 8/2020 | Lei | H04B 7/01 |
| 2020/0389805 A1 | 12/2020 | Kim et al. | |

FOREIGN PATENT DOCUMENTS

| | | | | |
|---|---|---|---|---|
| WO | WO-2018155885 A1 * | 8/2018 | | H04W 24/02 |
| WO | 2018213578 A1 | 11/2018 | | |
| WO | 2018/231127 A1 | 12/2018 | | |
| WO | 2018223386 A1 | 12/2018 | | |
| WO | 2018228421 A1 | 12/2018 | | |
| WO | 2020144624 A1 | 7/2020 | | |

OTHER PUBLICATIONS

Huawei et al., "On control signaling for duplexing flexibility", 3GPP TSG RAN WG1 NR Ad-Hoc Meeting, Jan. 16-20, 2017, R1-1700079, 3 pages.
Notification of Transmittal of the International Search Report and the Written Opinion of the International Searching Authority, or the Declaration dated May 22, 2020 in connection with International Patent Application No. PCT/KR2020/002102, 13 pages.
European Patent Office, "Supplementary Partial European Search Report" issued Mar. 9, 2022, in connection with European Patent Application No. 20755150.8, 18 pages.
Nokia et al., "On Cross-link Interference Management", 3GPP TSG RAN WG1 Meeting #95, Spokane, USA, R1-1812707, Nov. 12-16, 2018, 6 pages.
NTT DOCOMO et al., "Discussion on cross-link interference mitigation for duplexing flexibility", 3GPP TSG RAN WG1 Meeting #90, Prague, Czechia, R1-1713969, Aug. 21-25, 2017, 11 pages.
European Patent Office, "Supplementary European Search Report" issued Jun. 14, 2022, in connection with European Patent Application No. 20755150.8, 15 pages.
Communication under Rule 71(3) EPC dated Oct. 10, 2024, in connection with European Patent Application No. 20755150.8, 107 pages.

* cited by examiner

METHOD, TERMINAL DEVICE, BASE STATION, COMPUTER READABLE MEDIUM FOR MEASURING CROSS-LINK INTERFERENCE, AND METHODS AND APPARATUSES FOR RANDOM ACCESS PREAMBLE ALLOCATION, DETERMINATION, AND DATA TRANSMISSION

CROSS-REFERENCE TO RELATED APPLICATIONS

The application is a division of application Ser. No. 16/792,024, now U.S. Pat. No. 11,411,664, which is based on and claims priority under 35. U.S.C. 119 to Chinese Patent Application No. 201910116881.6 filed on Feb. 14, 2019 and Chinese Patent Application No. 201910510150.X filed on Jun. 13, 2019, the disclosures of which are herein incorporated by reference in their entirety.

BACKGROUND

1. Field

The present disclosure relates to the field of wireless communication technologies and, more particularly, to a method, terminal device, base station, and computer readable medium for measuring cross-link interference, and methods and apparatuses for random access preamble allocation, determination, and data transmission.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centred connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

The disclosure provides a measurement and feedback scheme for cross-link interference, especially for cells operating in a full-duplex mode and cells operating in a dynamic time-division duplex mode. By appropriately configuring measurement time-frequency resources and sequences and specifying the measurement and feedback schemes, the provided solution can effectively reduce the impact of cross-link interference on system performance.

In addition, in order to overcome the problem of a long access delay existing in the existing wireless communication technology, the present disclosure also provides a solution that may improve a random access success rate.

In an embodiment, there is provided a method for measuring cross-link interference. The method includes: receiving time-frequency resource configuration information from a base station, which time-frequency resource configuration information includes configuration information of measurement time-frequency resources for measuring the cross-link interference; determining measurement time-frequency resources for measuring the cross-link interference according to the time-frequency resource configuration information; measuring the cross-link interference on the measurement time-frequency resources; and feeding back a measurement result of the cross-link interference to the base station.

In an embodiment, the time-frequency resource configuration information comprises configuration information of reference signal time-frequency resources configured by the base station, and determining measurement time-frequency resources according to the time-frequency resource configuration information includes determining, as the measurement time-frequency resources, the reference signal time-frequency resources according to the configuration information of the reference signal time-frequency resources.

In an embodiment, the time-frequency resource configuration information comprises information of a set of reference signal time-frequency resources and resource index set indication information configured by the base station, and said determining measurement time-frequency resources according to the time-frequency resource configuration information includes determining reference signal time-frequency resources for uplink sounding and the measurement time-frequency resources for downlink measurement according to information of the set of the reference signal time-frequency resources and the resource index set indication information.

In an embodiment, the method further includes receiving sequence resource configuration information from the base station, wherein the sequence resource configuration information comprises at least one of:
 a root sequence configuration of a used reference signal sequence,
 a cyclic shift configuration, or
 a comb structure configuration.

In an embodiment, said measuring the cross-link interference on the measurement time-frequency resources includes measuring a Reference Signal Received Power (RSRP) according to a reference signal sequence or a set of reference signal sequences transmitted on the measurement time-frequency resources.

In an embodiment, said measuring the cross-link interference on the measurement time-frequency resources includes measuring received signal strength on the measurement time-frequency resources directly.

In an embodiment, said feeding back the measurement result of the cross-link interference to the base station includes at least one of:
 feeding back the measured RSRP or received signal strength directly,
 feeding back a degree of impact of the measured cross-link interference on a Modulation Coding Scheme (MCS) level, or
 feeding back an indication which indicates whether a terminal device is capable of being scheduled to receive downlink data on the current time-frequency resources.

In an embodiment, the time-frequency resource configuration information further includes at least one of:
 periodicity information in the configuration information of reference signal time-frequency resources,
 separately configured periodicity information for the measurement time-frequency resources, or
 separately configured time configuration information for the measurement time-frequency resources.

In an embodiment, the method further includes transmitting a downlink measurement request to the base station, and wherein the time-frequency resource configuration information and/or sequence resource configuration information received from the base station is configured by the base station in response to the downlink measurement request.

In an embodiment, the time-frequency resource configuration information and/or sequence resource configuration information received from the base station is semi-static.

In an embodiment, there is provided a method for determining cross-link interference. The method includes: configuring time-frequency resources for a terminal device, which time-frequency resources comprise measurement time-frequency resources for measuring the cross-link interference; transmitting time-frequency resource configuration information to the terminal device; receiving, from the terminal device, a measurement result of cross-link interference measured by the terminal device on measurement time-frequency resources for measuring the cross-link interference determined according to the time-frequency resource configuration information; and scheduling the terminal device according to the measurement result.

In an embodiment, said configuring time-frequency resources for a terminal device includes: configuring, as the measurement time-frequency resources, reference signal time-frequency resources for the terminal device.

In an embodiment, said configuring time-frequency resources for a terminal device includes: configuring a set of reference signal time-frequency resources and a resource index set indication for the terminal device, and wherein the set of reference signal time-frequency resources and the resource index set indication are used to determine reference signal time-frequency resources for uplink sounding and the measurement time-frequency resources for downlink measurement.

In an embodiment, the method further includes: configuring a sequence resource configuration for the terminal device, and transmitting sequence resource configuration information to the terminal device, and wherein the sequence resource configuration information comprises at least one of:
 a root sequence configuration of a used reference signal sequence,
 a cyclic shift configuration, or
 a comb structure configuration.

In an embodiment, said receiving, from the terminal device, a measurement result includes: receiving a Reference Signal Received Power (RSRP) measured by the terminal device according to a reference signal sequence or a set of reference signal sequences transmitted on the measurement time-frequency resources.

In an embodiment, said receiving, from the terminal device, a measurement result includes: receiving a received signal strength measured directly by the terminal device on the measurement time-frequency resources.

In an embodiment, the measurement result comprises at least one of:
 the measured RSRP or received signal strength measured by the terminal device,
 a degree of impact of the measured cross-link interference on Modulation Coding Scheme (MCS) level, or
 an indication which indicates whether the terminal device is capable of being scheduled to receive downlink data on the current time-frequency resources.

In an embodiment, said configuring time-frequency resources for a terminal device includes at least one of:
 configuring a period of reference signal time-frequency resources as a period of the measurement time-frequency resources,
 configuring a period of the measurement time-frequency resources separately, or
 configuring time configuration information of the measurement time-frequency resources separately.

In an embodiment, the method further includes: receiving a downlink measurement request from the terminal device, and wherein said configuring time-frequency resources and/or sequence resources for the terminal device is performed by the base station in response to the downlink measurement request.

In an embodiment, said configuring time-frequency resources and/or sequence resources for the terminal device is performed semi-statically.

In an embodiment, there is provided a terminal device. The terminal device includes a processor; and a memory having stored therein computer-executable instructions which, when executed by the processor, cause the terminal device to execute the method according to the first aspect of the present disclosure.

In an embodiment, there is provided a base station. The base station includes a processor; and a memory having stored therein computer-executable instructions which, when executed by the processor, cause the terminal device to execute the method according to the second aspect of the present disclosure.

In an embodiment, there is provided computer-readable medium having stored thereon instructions which, when executed by a processor, cause the processor to perform the method according to the first or second aspect of the present disclosure.

In an embodiment, there is provided a random access preamble allocation method, which includes determining whether an interference strength between adjacent cells is greater than a strength threshold; and when the interference strength is greater than the strength threshold, allocating, for each of the adjacent cells, an identical ZC sequence length, an identical cyclic shift interval, an identical logical root sequence number, and different and continuous random access preamble set index numbers, wherein the ZC sequence length, the cyclic shift interval, the logical root sequence number, and the random access preamble set index number are configured to determine an available random access preamble set of the each of the adjacent cells, and wherein the random access preamble generated from the identical logical root sequence number exists in the available random access preamble set corresponding to at least two continuous random access preamble set index numbers.

In an embodiment, a sub-carrier space corresponding to the random access preamble is lower than 1.25 KHz.

In an embodiment, the sub-carrier space is equal to 1 KHz, and a pre guard period of the random access preamble and a cyclic prefix of the random access preamble are located in a transmission time interval prior to the transmission time interval where the random access preamble is located.

In an embodiment, the sub-carrier space is higher than 1 KHz and lower than 1.25 KHz, and a sum of lengths of following items is 1 ms: a pre guard period of the random access preamble, a cyclic prefix of the random access preamble, the random access preamble, and a post guard period of the random access preamble.

In an embodiment, the post guard period is zero, and a cyclic prefix of a first orthogonal frequency division multiplexing (OFDM) symbol in a transmission time interval subsequent to the transmission time interval, where the random access preamble is located, functions as the post guard period of the random access preamble, or the length of the pre guard period is equal to the length of the cyclic prefix of the random access preamble, and a difference between a sum of lengths, which include the length of the post guard period and a length of the cyclic prefix of the first OFDM symbol of the subsequent transmission time interval, and the length of the cyclic prefix of the random access preamble is smaller than or equal to 2 Ts, or the length of the pre guard period is zero, and a difference between the length of the post guard period and the length of the cyclic prefix of the random access preamble is smaller than or equal to 2 Ts.

According to a seventh aspect of the present disclosure, there is provided a random access preamble determination method, which includes: obtaining information of a target cell, the information including a ZC sequence length, a logical root sequence number, a random access preamble set index number, and a cyclic shift interval; calculating an initial logical root sequence number and an initial cyclic shift index according to the obtained information; determining an available random access preamble set of the target cell according to the cyclic shift interval, the calculated initial logical root sequence number, and the calculated initial cyclic shift index, wherein a random access preamble generated from the identical logical root sequence number exists in the available random access preamble set corresponding to at least two continuous random access preamble set index numbers.

In an embodiment, the calculating the initial logical root sequence number and the initial cyclic shift index according to the obtained information includes: calculating, according to the ZC sequence length and the cyclic shift interval, a number of random access preambles generated from one logical root sequence number; calculating the initial logical root sequence number, according to the logical root sequence number, the random access preamble set index number, and the calculated number of the random access preambles; and calculating the initial cyclic shift index, according to the random access preamble set index number and the calculated number of the random access preambles.

In an embodiment, the determining the available random access preamble set of the target cell includes: determining, according to a correspondence between the logical root sequence number and a physical root sequence number, an initial physical root sequence number corresponding to the initial logical root sequence number; selecting and generating, according to the initial physical root sequence number, a random access preamble of which a cyclic shift amount is greater than or equal to a product of the initial cyclic shift index and the cyclic shift interval and of which the number is a predetermined number, wherein when the number of the random access preamble, of which the cyclic shift amount generated according to the initial physical root sequence number is greater than or equal to the product of the initial cyclic shift index and the cyclic shift interval, is smaller than the predetermined number, the logical root sequence number is increased by 1; in the random access preamble corresponding to a consecutive logical root sequence number after being increased by 1, an additional random access preamble is selected starting from the random access preamble of which a cyclic shift index is smallest, in an order of the cyclic shift index from small to large, to be expanded into the random access preamble that has been selected; and operations of increasing the logical root sequence number by 1 and selecting the random access preamble in the order are repeated, until the number of the selected random access preamble reaches the predetermined number.

In an embodiment, there is provided a data transmission method, which includes: receiving scheduling information from a base station; determining whether an allocated resource indicated by the scheduling information from the base station includes a resource which is at least overlapped with a cyclic prefix of a random access preamble or the random access preamble; obtaining indication information indicating whether transmission is allowed on the overlapped resource; when a result of the determining indicates that there is the overlapped resource and the indication information indicates that the transmission is allowed on the overlapped resource, transmitting a signal on the overlapped resource; and when the result indicates that there is the overlapped resource and the indication information indicates that a user equipment shall avoid the overlapped resource when transmitting the signal, avoiding the overlapped resource when transmitting the signal, wherein a sub-carrier space corresponding to the random access preamble is equal to or smaller than 1 KHz, and at least the cyclic prefix of the random access preamble or the random access preamble is located in a transmission time interval prior to the transmission time interval where the random access preamble is located.

In an embodiment, there is provided a system of a storage device including at least one computing device and at least one storage device storing an instruction, wherein when the instruction is operated by the at least one computing device, the at least one computing device is enabled to perform the method according to any of the fifth to eighth aspects of the present disclosure.

In an embodiment, there is provided a computer readable storage medium for storing an instruction, wherein when the instruction is operated by at least one computing device, the at least one computing device is enabled to perform the method according to any of the fifth to eighth aspects of the present disclosure.

In an embodiment, there is provided a random access preamble allocation apparatus, which includes: an interference strength determining unit, which determines whether an interference strength between adjacent cells is greater than a strength threshold; and an index number allocating unit, which allocates, for each of the adjacent cells, an identical ZC sequence length, an identical cyclic shift interval, an identical logical root sequence number, and different and continuous random access preamble set index numbers, when the interference strength is greater than the strength threshold, wherein the ZC sequence length, the cyclic shift interval, the logical root sequence number, and the random access preamble set index number are configured to determine an available random access preamble set of the each of the adjacent cells, and wherein the random access preamble generated from the identical logical root sequence number exists in the available random access preamble set corresponding to at least two continuous random access preamble set index numbers.

In an embodiment, a sub-carrier space corresponding to the random access preamble is lower than 1.25 KHz.

In an embodiment, the sub-carrier space is equal to 1 KHz, and a pre guard period of the random access preamble and a cyclic prefix of the random access preamble are located in a transmission time interval prior to the transmission time interval where the random access preamble is located.

In an embodiment, the sub-carrier space is higher than 1 KHz and lower than 1.25 KHz, and a sum of lengths of following items is 1 ms: a pre guard period of the random access preamble, a cyclic prefix of the random access preamble, the random access preamble, and a post guard period of the random access preamble.

In an embodiment, the post guard period is zero, and a cyclic prefix of a first orthogonal frequency division multiplexing (OFDM) symbol in a transmission time interval subsequent to the transmission time interval, where the random access preamble is located, functions as the post guard period of the random access preamble, or, the length of the pre guard period is equal to the length of the cyclic prefix of the random access preamble, and a difference between a sum of lengths, which include the length of the post guard period and a length of the cyclic prefix of the first OFDM symbol of the subsequent transmission time interval, and the length of the cyclic prefix of the random access preamble is smaller than or equal to 2 Ts, or, the length of the pre guard period is zero, and a difference between the length of the post guard period and the length of the cyclic prefix of the random access preamble is smaller than or equal to 2 Ts.

In an embodiment, there is provided a random access preamble determination apparatus, which includes: an information obtaining unit, which obtains information of a target cell, the information including a ZC sequence length, a logical root sequence number, a random access preamble set index number, and a the cyclic shift interval; a calculating unit, which calculates an initial logical root sequence number and an initial cyclic shift index according to the obtained information; and a random access preamble set determining unit, which determines an available random access preamble set of the target cell according to the cyclic shift interval, the calculated initial logical root sequence number, and the calculated initial cyclic shift index, wherein a random access preamble generated from the identical logical root sequence number exists in the available random access preamble set corresponding to at least two continuous random access preamble set index numbers.

In an embodiment, the calculating unit is configured to: calculate, according to the ZC sequence length and the cyclic shift interval, a number of random access preambles generated from one logical root sequence number; calculate the initial logical root sequence number, according to the logical root sequence number, the random access preamble set index number, and the calculated number of the random access preambles; and calculate the initial cyclic shift index, according to the random access preamble set index number and the calculated number of the random access preambles.

In an embodiment, the random access preamble set determining unit is configured to: determine, according to a correspondence between the logical root sequence number and a physical root sequence number, an initial physical root sequence number corresponding to the initial logical root sequence number; and select and generate, according to the initial physical root sequence number, a random access preamble of which a cyclic shift amount is greater than or equal to a product of the initial cyclic shift index and the cyclic shift interval and of which the number is a predetermined number, wherein when the number of the random access preamble, of which the cyclic shift amount generated according to the initial physical root sequence number is greater than or equal to the product of the initial cyclic shift index and the cyclic shift interval, is smaller than the predetermined number, the logical root sequence number is increased by 1; in the random access preamble corresponding to a consecutive logical root sequence number after being increased by 1, an additional random access preamble is selected starting from the random access preamble of which a cyclic shift index is smallest, in an order of the cyclic shift index from small to large, to be expanded into the random access preamble that has been selected; and operations of increasing the logical root sequence number by 1 and selecting the random access preamble in the order are repeated, until the number of the selected random access preamble reaches the predetermined number.

In an embodiment, there is provided a data transmission apparatus, which includes: a scheduling information receiving unit, which receives scheduling information from a base station; a determining unit, which determines whether an allocated resource indicated by the scheduling information from the base station includes a resource which is at least overlapped with a cyclic prefix of a random access preamble or the random access preamble; an indication information obtaining unit, which obtains indication information indicating whether transmission is allowed on the overlapped resource; a data transmitting unit, which transmits a signal on the overlapped resource, when a result of the determination indicates that there is the overlapped resource and the indication information indicates that the transmission is allowed on the overlapped resource, and avoids the overlapped resource when transmitting the signal, when the result indicates that there is the overlapped resource and the indication information indicates that a user equipment shall avoid the overlapped resource when transmitting the signal, wherein a sub-carrier space corresponding to the random access preamble is equal to or smaller than 1 KHz, and at least the cyclic prefix of the random access preamble or the random access preamble is located in a transmission time interval prior to the transmission time interval where the random access preamble is located.

According to a fourteenth aspect of the present disclosure, there is provided a physical random access channel, which includes: a random access preamble and a cyclic prefix of the random access preamble, wherein a sub-carrier space corresponding to the random access preamble is lower than 1.25 KHz.

In an embodiment, the sub-carrier space is equal to 1 KHz, and the physical random access channel includes a pre guard period, and the random access preamble and a cyclic prefix of the random access preamble are located in a transmission time interval prior to the transmission time interval where the random access preamble is located.

In an embodiment, the sub-carrier space is higher than 1 KHz and lower than 1.25 KHz, and the physical random access channel includes a pre guard period and a post guard period, and a sum of lengths of following items is 1 ms: the pre guard period of the random access preamble, the cyclic prefix of the random access preamble, the random access preamble, and the post guard period of the random access preamble.

In an embodiment, a length of the post guard period is zero, and a cyclic prefix of a first OFDM symbol in a transmission time interval subsequent to the transmission time interval, where the random access preamble is located, functions as the post guard period of the random access preamble, or, the length of the pre guard period is equal to the length of the cyclic prefix of the random access preamble, and a difference between a sum of lengths, which include the length of the post guard period and a length of the cyclic prefix of the first OFDM symbol of the subsequent transmission time interval, and the length of the cyclic prefix of the random access preamble is smaller than or equal to 2 Ts, or, the length of the pre guard period is zero, and a difference between the length of the post guard period and the length of the cyclic prefix of the random access preamble is smaller than or equal to 2 Ts.

According to the embodiment of the present disclosure, when the sub-carrier space corresponding to the random access preamble is lower than 1.25 KHz, the length of the random access preamble may be increased, and the number of orthogonal random access preambles may also be increased, so as to improve a detection success rate of the random access preamble. According to another embodiment of the present disclosure, the random access preambles generated from the identical logical root sequence number are enabled to exist in the available random access preamble set corresponding to at least two continuous random access preamble set index numbers, so as to be also possible to increase the number of the orthogonal random access preambles. According to the present disclosure, when performing a downlink signal transmission on a random access resource, interferences, which come from the random access preamble of the present cell, the random access preamble of the adjacent cell, and the downlink signal of the adjacent cell, and which are performed on the random access preamble itself, may be reduced, and the interference from the random access preamble on uplink and downlink data transmission of the present cell may also be reduced, so that a success rate of a random access of a terminal may be improved.

Additional aspects and/or advantages of a general concept of the present disclosure will be stated in the following descriptions in part, and another part will be clear through the descriptions, or may be known through implementation of the general concept of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
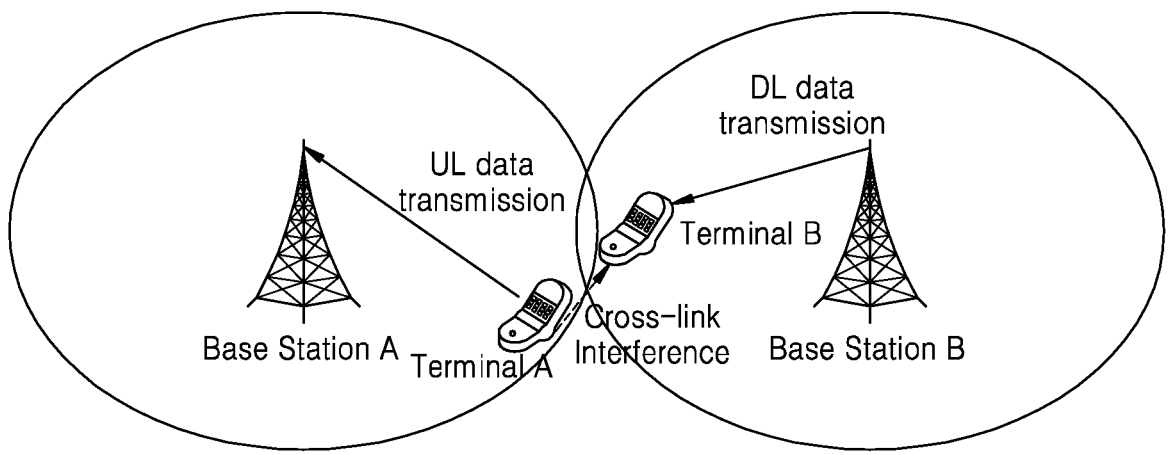
FIG. 1 schematically illustrates a diagram of inter-cell cross-link interference according to an embodiment of the present disclosure.

FIGS. 1 through 29, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure are described in detail below, examples of which are illustrated in the accompanying drawings, in which the same or similar reference numbers denote the same or similar elements or elements having the same or similar functions throughout. The embodiments described below with reference to the drawings are for explaining the present disclosure only, and should not be construed as limiting the present disclosure.

It will be understood by the skilled in the art that singular forms "a", "an", "said" and "the" used herein may also include plural forms, unless specifically stated. It should be further understood that the word "comprising" used in the description of the present disclosure refers to presence of features, integers, steps, operations, elements, and/or components, but does not exclude presence or addition of one or more other features, Integers, steps, operations, elements, components, and/or combinations thereof. It should be understood that when an element is referred to as being "connected" or "coupled" to another element, it can be directly connected or coupled to the other element, or there may also be intermediate elements. In addition, "connected" or "coupled" as used herein may include wirelessly connected or wirelessly coupled. As used herein, the phrase "and/or" includes all or any of one or more of associated listed items, and all of combinations thereof.

It may be understood by the skilled in the art that, unless defined otherwise, all terms (including technical and scientific terms) used herein have the same meaning as commonly understood by the skilled in the art to which the present disclosure belongs. It should also be understood that the terms such as those defined in a general dictionary should be understood as having a meaning that is consistent with that in the context of the prior art, and will not be explained with an idealized or too formal meaning, unless specifically defined herein.

The skilled in the art may understand that the "terminal" and "terminal device" used herein include not only a wireless signal receiver device, which is a device only having a wireless signal receiver without a transmitting capability, but also a device with receiving and transmitting hardware, which is a device having receiving and transmitting hardware capable of performing a bidirectional communication over a bidirectional communication link. Such a device may include: a cellular or other communication device having a single line display or a multi-line display or a cellular or other communication device without a multi-line display; a Personal Communication Service (PCS), which may combine voice, data processing, fax and/or data communication capabilities; a Personal Digital Assistant (PDA), which may include a Radio Frequency (RF) receiver, a pager, Internet/Intranet access, a web browser, a notepad, a calendar, and/or a Global Positioning System (GPS) receiver; a conventional laptop and/or palmtop computer or other device, which may be a conventional laptop and/or palmtop computer or other device having and/or including an RF receiver. The "terminal", "terminal device" as used herein may be portable, transportable, installed in a vehicle (of aviation, maritime, and/or land), or may be adapted and/or configured to operate locally, and/or may operate in a distributed form on the earth and/or at any other locations in space. The "terminal" and "terminal device" used herein may also be a communication terminal, an Internet terminal, a music/video playing terminal, such as a PDA, a Mobile Internet Device (MID), and/or a mobile phone having a music/video playback function, or a smart TV, a set-top box and other devices.

Generally, the present disclosure provides a method for measuring and feeding back cross-link interference, which is suitable for a half-duplex terminal device operating in a cell served by a full-duplex base station. The terminal device may perform the following operations: receiving measurement time-frequency resource configuration information transmitted from the base station; measuring cross-link interference according to the measurement time-frequency resources configured by the base station; feeding back the measurement result of the cross-link interference to the base station; and receiving scheduling of the base station information.

In addition, the present disclosure provides a method for determining cross-link interference, which is suitable for a system operating in dynamic time division duplex mode, in which a target base station may perform the following operations: configuring measurement time-frequency resources according to time slot transmission direction of the local cell and the neighboring cell; transmitting measurement time-frequency resource configuration information to the terminal device; receiving a measurement result fed back by the terminal device; and transmitting the measurement result to the interfering base station.

Correspondingly, the downlink terminal device served by the target base station may perform the following operations: receiving measurement time-frequency resource configuration information transmitted from the base station; measuring cross-link interference according to the measurement time-frequency resources configured by the base station; and feeding back a measurement result of cross-link interference.

The interfering base station may perform the following operations: receiving the measurement result transmitted by the target base station; and transmitting scheduling information to the interfering terminal device.

In order to make the purpose, technical means, and advantages of the present application clearer, the present application is further described in detail below with reference to the accompanying drawings.

Figure 2:
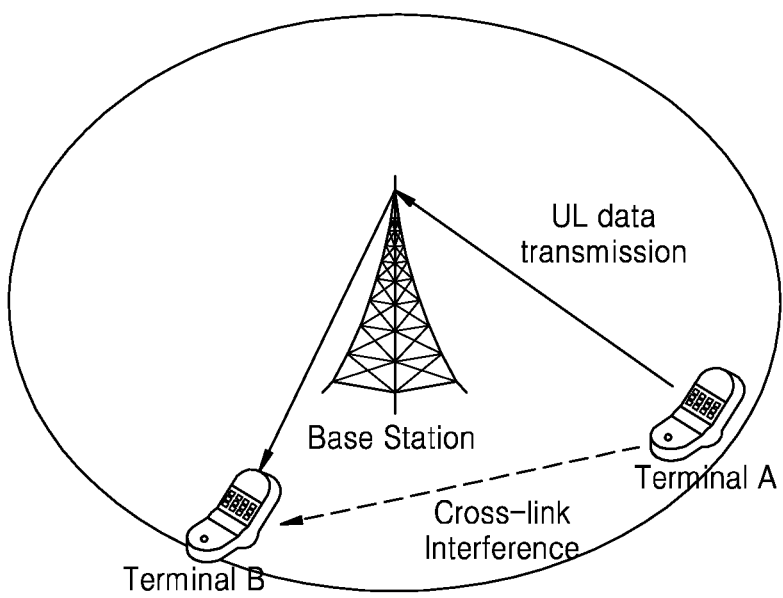
FIG. 2 schematically shows a diagram of cross-link interference in a cell according to an embodiment of the present disclosure.

FIG. 1 schematically illustrates a diagram of inter-cell cross-link interference according to an embodiment of the present disclosure. FIG. 2 schematically shows a diagram of cross-link interference in a cell according to an embodiment of the present disclosure.

As estimated by ITU, the global monthly mobile data traffic will reach 62 exabytes (EB, 1 EB=230 GB) by 2020, and from 2020 to 2030, the global mobile data service will even grow at a rate of about 55% per year. In addition, the proportion of video services and machine and machine communication services in mobile data services will gradually increase. In 2030, video services will be five times more than non-video services, while machine and machine communication services will account for about 12% of mobile data services (See, "IMT traffic estimates for the years 2020 to 2030, Report ITU-R M.2370-0").

The rapid growth of mobile data services, especially the exponential growth of high-definition video and ultra-high-definition video services, puts higher demands on the transmission rate of wireless communications. In order to meet the growing demand of mobile services, it needs to propose new technologies based on 4G or 5G to further improve the transmission rate and throughput of wireless communication systems.

Improvements to the duplex technologies are an important means of further increasing the transmission rate and throughput of wireless communication systems. The duplex technologies used in existing systems and protocols, including Frequency Division Multiplexing (FDM) and Time Division Multiplexing (TDM), cannot fully utilize the available time-frequency resources, with the resource utilization efficiency less than 50%.

One possible improvement is to flexibly change the transmission direction (uplink or downlink) of each time slot according to factors such as traffic data or demand, which is referred to as Dynamic Time Division Duplex (Dynamic TDD) technology. By configuring the transmission direction of a time slot in a semi-static or dynamic manner, the flexibility of time-frequency resource configuration can be improved, thereby improving the performance of the system.

Another possible improvement is to use a full-duplex technology. Unlike traditional half-duplex systems, which use time domain (time division duplexing, TDD) or frequency domain (frequency division duplexing, FDD) orthogonal segmentation for uplink and downlink, full-duplex systems allow simultaneous transmission of users' uplink and downlink in the time domain and in the frequency domain. Therefore, a full-duplex system can theoretically achieve twice the throughput of a half-duplex system. However, since the uplink and downlink are simultaneous and at the same frequency, the transmission signal of the full-duplex system will have strong self-interference on the received signal, and the self-interference signal will be more than 120 dB higher than the noise floor. Therefore, in order for a full-duplex system to work, the core issue is to design a solution to eliminate the self-interference and reduce the strength of the self-interference signal to at least the same level as the noise floor.

Whether it is dynamic time division duplex or full duplex, there is a problem of cross-link interference. For the dynamic time division duplex, cross-link interference mainly occurs between cells. As shown in FIG. 1, if the neighboring cells are configured with different uplink/downlink transmission directions, for users at the edge of the cells, when a use receives downlink data transmitted by its own base station in a downlink time slot, it will be interfered by uplink data transmitted from users at the edge of the neighbor cell on the uplink, resulting in cross-link interference.

For the full-duplex technology, cross-link interference also exists in the cell. For example, for a full-duplex base station serving a half-duplex user, it receives uplink data while transmitting downlink data. At this time, a user who transmits the uplink data will cause cross-link interference to a user who receives the downlink data, as shown in FIG. 2.

An effective solution to the aforementioned cross-link interference is desired.

In addition, the full-duplex technology may further improve a spectrum use rate on the basis of the existing wireless communication system, and different from the TDD or FDD adopted in the uplink and the downlink by the traditional half-duplex system, the full-duplex technology allows simultaneous transmission of the uplink and downlink in a time domain and a frequency domain. Therefore, the throughput of the full-duplex system may reach two times of that of the half-duplex system in theory. As for a small cell and a macro cell, a radius of the macro cell is larger; in order to ensure coverage, it needs a base station to increase emission power; and when a full-duplex communication is configured in the macro cell, it needs to further increase the emission power to eliminate self-interference. Since the increased power will affect data transmission and a random access procedure, a current full-duplex technology is not applicable to the macro cell, and is only applicable to the small cell having a smaller radius relative to the macro cell.

A study with respect to the full-duplex system includes reducing access delay, to allow a terminal to access to a cell with a shorter delay. As for the small cell having a smaller radius, types and strengths of interferences within and among the cells will be increased when a full-duplex communication is adopted, and for example, a random access preamble transmitted by the terminal may be interfered by a downlink signal of the present cell and a downlink signal of a neighboring cell. Due to the increasing of the types and strengths of the interferences, a random access success rate of the terminal in the cell which supports the full-duplex communication may be affected, and when an initial random access fails, the terminal may initiate a random access again after a period of time, resulting in that an access time delay will become large, and a transmitting power of the random access preamble will make an interference on transmitting of the random access preamble of another terminal. Therefore, improving the random access success rate of the full-duplex system is be considered by the full-duplex system.

A method of improving the random access success rate of the full-duplex system includes designing a resource for a random access as a one-way resource, that is to say, any downlink signal transmission of the present cell and an adjacent cell thereof is forbidden on a resource transmitting the random access preamble. However, the method will cause a low resource usage rate.

Therefore, there is also a need of a method which may improve the random access success rate.

Hereinafter, a method for measuring cross-link interference performed at a terminal device according to an embodiment of the present disclosure will be described with reference to FIG. 3.

Figure 3:
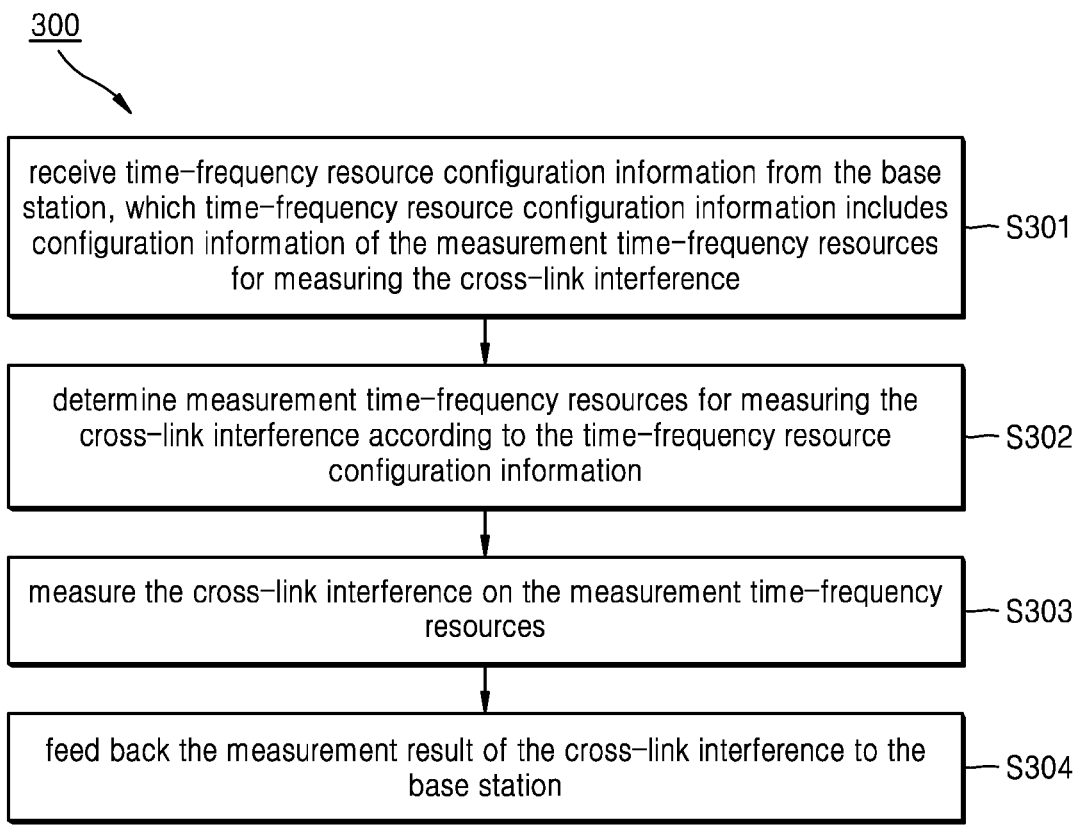
FIG. 3 schematically illustrates a flowchart of a method for measuring cross-link interference performed at a terminal device according to an embodiment of the present disclosure.

FIG. 3 schematically illustrates a flowchart of a method for measuring cross-link interference performed at a terminal device according to an embodiment of the present disclosure.

In this embodiment, there is provided a method for reducing cross-link interference in a cell generated between terminal devices having opposite transmission directions that are served on the same time-frequency resources in the same cell. In the method, the base station configures reference signal resources (including reference signal time-frequency resources and/or reference signal sequence resources) for the uplink terminal device (that is, the terminal device performing uplink transmission); meanwhile, the base station configures measurement resources (including time-frequency resources for measurement and/or sequence resources for measurement) for the downlink terminal device (that is, the terminal device performing downlink transmission), where all available reference signal time-frequency resources configured for the uplink terminal device and all available measurement time-frequency resources configured for the downlink terminal device overlap each other. The uplink reference signal time-frequency resources configured for a single terminal device are a subset of all available reference signal time-frequency resources; the downlink measurement time-frequency resources configured for a single terminal device are a subset of all available measurement time-frequency resources. The above configuration is shown in FIG. 4.

Figure 4:
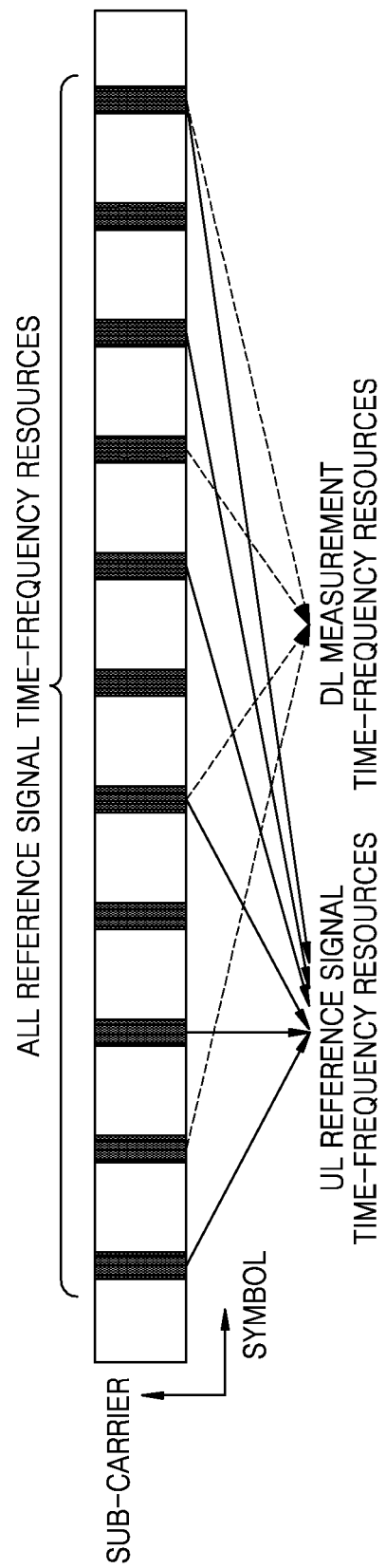
FIG. 4 schematically illustrates a diagram of a time-frequency resource configuration according to an embodiment of the present disclosure.

FIG. 4 schematically illustrates a diagram of a time-frequency resource configuration according to an embodiment of the present disclosure.

It should be noted that in the example shown in FIG. 4, the uplink reference signal time-frequency resources and the downlink measurement time-frequency resources may be allocated to different terminal devices.

As shown in FIG. 3, a method 300 for reducing cross-link interference performed at a terminal device according to an embodiment of the present disclosure may include steps S301 to S304.

In step S301, the terminal device may receive time-frequency resource configuration information from the base station.

Here, the time-frequency resource configuration information may include configuration information of the measurement time-frequency resources for measuring the cross-link interference.

Alternatively, or additionally, the terminal device may receive the sequence resource configuration information from the base station.

Here, the sequence resource configuration information may include at least one of: a root sequence configuration of a used reference signal sequence, a cyclic shift configuration, or a comb structure configuration, which will be described in detail later.

In step S302, the terminal device may determine measurement time-frequency resources for measuring the cross-link interference according to the time-frequency resource configuration information.

In an embodiment, the measurement time-frequency resources may be uplink reference signal (e.g., uplink sounding reference signal, SRS) time-frequency resources configured by the base station, that is, the uplink reference signal time-frequency resources are used as measurement time-frequency resources of a downlink terminal device.

Considering that the base station operating in full-duplex mode has the same uplink and downlink time-frequency resources, and the uplink and downlink physical resource block indexed by the same physical resource block have the same frequency domain positions, it directly configures the reference signal time-frequency resources configured for the uplink terminal device for the downlink terminal device to measure cross-link interference.

If this method is used, the time-frequency resource configuration information received in step S301 may include configuration information of the reference signal time-frequency resources configured by the base station. Accordingly, step S302 may include: the terminal device determines, as the measurement time-frequency resources, the reference signal time-frequency resources according to the configuration information of the reference signal time-frequency resources.

In an embodiment, the terminal device may read system information or reference signal time-frequency resource configuration information configured in the downlink control channel; and determine a position of the measurement time-frequency resources according to the configured reference signal time-frequency resource configuration information.

The reference signal time-frequency resources are configured periodically, and their periodicity indication is located in the configuration information of the reference signal time-frequency resources. The measurement time-frequency resources for downlink measurement may also be periodically configured. The base station may periodically configure the measurement time-frequency resources for downlink measurement in the following manner:

1.a Use the period configuration in the reference signal time-frequency resource configuration information. In this way, all configuration information for the measurement time-frequency resources uses time-frequency resource configuration information of a reference signal.

1.b Configure the period of the measurement time-frequency resources separately. In this method, the frequency domain resources use the frequency domain configuration information of the reference signal, and the time slot offset in the time domain resource configuration information uses the time-frequency resource configuration of the reference signal, and the period configuration information uses dedicated downlink measurement cycle configuration information. The period configuration information may be configured in system information or may be configured in a downlink control channel.

1.c Configure the time domain configuration information for the measurement time-frequency resources separately. In this manner, only the frequency domain resources use the frequency domain configuration information of the reference signal, and the time domain resources are determined based on the separately configured time domain configuration information for the measurement time frequency resources. The time domain configuration information includes a slot offset configuration and a period configuration. The time domain configuration information can be configured in system information or in a downlink control channel.

Among the foregoing manners, the configuration information of manner 1.a is the least, but the configuration flexibility is the lowest. Manner 1.c can improve the configuration flexibility by using a separate time domain resource configuration while multiplexing a part of the reference signal resource configuration. The signaling overhead and configuration flexibility of Manner 1.b is between 1.a and 1.c.

Accordingly, the time-frequency resource configuration information received by the terminal device may comprise at least one of:
periodicity information in configuration information of the reference signal time-frequency resources,
separately configured periodicity information for the measurement time-frequency resources, or
separately configured time configuration information for the measurement time-frequency resources.

In another embodiment, the base station may configure a plurality of reference signal time-frequency resources for the terminal device, and indicate a reference signal resource index for downlink measurement and a reference signal resource index for uplink sounding to be used by the terminal device. The plurality of reference signal resources (that is, a set of reference signal resources) configured by the base station are configured and notified in system information or downlink control channels; the resource index set indicate used to indicate resources to the terminal device is configured and notified in system information or downlink control channels.

In this way, the time-frequency resource configuration information may include information of a set of reference signal time-frequency resources and resource index set indication information configured by the base station.

In this embodiment, step S302 may include: determining reference signal time-frequency resources for uplink sounding and the measurement time-frequency resources for downlink measurement according to information of the set of the reference signal resources and the resource index set indication information.

In an embodiment, the measurement time-frequency resources of the downlink terminal device may be determined according to the following manner:
reading the system configuration information to obtain the reference signal resource set information;
reading the resource index set indication information to determine the reference signal time-frequency resources for uplink sounding and the reference signal time-frequency resources for downlink measurement.

The resource index set may be configured in the following ways:

2.a The resource index set indication information indicates reference signal resources for uplink sounding, and the remaining reference signal resources are used for downlink measurement. For example, the maximum number of available reference signal resources $S_{MAX}$ is configured and notified in the reference signal resource set configuration. The resource index set indication information indicates the number of reference signal resources $S_{UL}$ for uplink sounding. After acquiring the reference signal resource set configuration information and the resource index set indication information, the terminal device can know that the reference signal resource indexes for uplink sounding are $1\sim S_{UL}$, and the reference signal resource indexes for downlink measurement are $S_{UL}+1\sim S_{MAX}$. If $S_{UL}=S_{MAX}$, the terminal device is configured with no reference signal resource for downlink measurement.

2.b The resource index set indication information indicates reference signal resources for downlink measurement, and the remaining reference signal resources are used for uplink sounding. For example, the maximum number of available reference signal resources $S_{MAX}$ is configured and notified in the reference signal resource set configuration. The resource index set indication information indicates the number of reference signal resources $S_{DL}$ for downlink measurement. After acquiring the reference signal resource set configuration information and the resource index set indication information, the terminal device can know that the reference signal resource indexes for downlink measurement are $1\sim S_{DL}$, and the reference signal resource indexes for uplink sounding are $S_{DL}+1\sim S_{MAX}$.

2.c The resource index set indication information indicates the number of reference signal resources for uplink sounding and the number of reference signal resources for downlink measurement. After acquiring the indication information, the terminal device can obtain reference signal resource indexes for uplink sounding and reference signal resource indexes for downlink measurement.

2.d The resource index set indication information indicates a reference signal resource termination index for uplink sounding and a reference signal resource termination index for downlink measurement. After acquiring the resource index set indication information, the terminal device can obtain the reference signal resource index for uplink sounding and the reference signal resource index for downlink measurement through the termination indexes.

For example, one possible manner is that if the resource index set indication information obtained by the terminal device from the configuration information includes a reference signal resource termination index $I_{UL}$ for uplink sounding and a reference signal resource termination index $I_{DL}$ for downlink measurement, and $I_{UL}<I_{DL}$, the reference signal resource indexes for uplink sounding are $1 \sim I_{UL}$, and the reference signal resource indexes for downlink measurement are $I_{UL}+1 \sim I_{DL}$.

In this embodiment, similar to the previous embodiment, the time-frequency resource configuration information also includes at least one of:

periodicity information in the configuration information of the reference signal time-frequency resources, separately configured periodicity information for the measurement time-frequency resources, or separately configured time configuration information for the measurement time-frequency resources.

In another embodiment, the base station may configure time-frequency resources for downlink measurement in the system information or the downlink control channel. The configuration information includes a frequency-domain starting physical resource block index, frequency-domain bandwidth configuration information for configuring a bandwidth of the measurement time-frequency resources, time-domain slot offset configuration information, time-domain starting symbol configuration information, time-domain period configuration information and time domain symbol number configuration information.

After receiving the above information, the terminal device knows the time-frequency resources for downlink measurement.

After the terminal device knows the downlink time-frequency resources for measurement, it can measure the cross-link interference on the measurement time-frequency resources in step S303. Specifically, step S303 may include:

When the terminal device receives the sequence resource configuration information, it measures and obtains a Reference Signal Received Power (RSRP) according to a reference signal sequence or a reference signal sequence set transmitted on the measurement time-frequency resource;

When the terminal device fails to receive the sequence resource configuration information, it directly measures the received signal strength on the measurement time-frequency resources.

For the foregoing implementation in which the uplink reference signal time-frequency resources are used as the downlink measurement time-frequency resources, if the foregoing manners of multiplexing or partially multiplexing reference signal time-frequency resources are used, the configured reference signal sequence resources may be used. That is, the terminal device reads the reference signal sequence resources configured for the terminal device, and the configuration information of the reference signal sequence resources may include at least one of: a root sequence configuration of the used reference signal sequence, a cyclic shift configuration, a comb structural configuration, and so on.

In this embodiment, the terminal device reads the sequence configuration of the reference signal, so as to obtain the sequence configuration for downlink measurement. If a plurality of reference sequences are configured on the same time-frequency resources, and the plurality of reference sequences are distinguished by cyclic shift, comb structure, etc., the terminal device measures the plurality of reference sequences, respectively, to obtain RSRPs of the plurality of reference sequences.

In another embodiment, the terminal device knows part of the reference sequence configuration. The base station configures part of sequence information for downlink measurement in the configuration information or system information. For example, the base station configures comb structure configuration information of a sequence for downlink measurement in the configuration information or system information. According to the comb structure configuration information, the terminal device measures each comb structure, and obtains a measurement result of the received power of each comb structure. This process is shown in FIG. 5.

Figure 5:
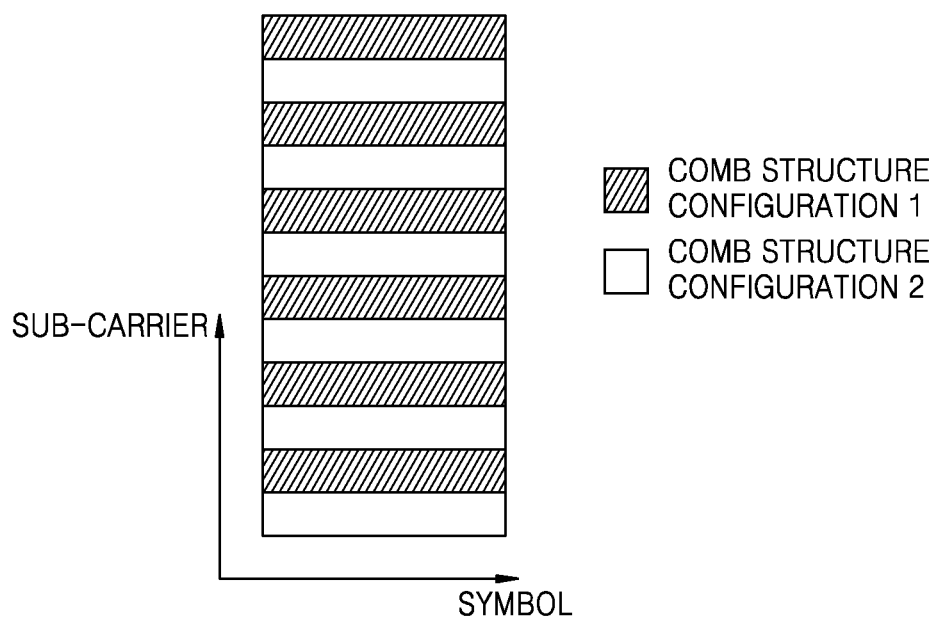
FIG. 5 schematically illustrates a diagram of a comb structure measurement according to an embodiment of the present disclosure.

FIG. 5 schematically illustrates a diagram of a comb structure measurement according to an embodiment of the present disclosure.

In this embodiment, several different reference signals may use the same comb structure. At this time, when the terminal device measures a configured comb structure, it measures the sum of power of the several reference sequences using the same comb structure. A simple example is as following. The uplink reference signal configuration transmitted on the same time-frequency resources includes: comb structure configuration 1 and comb structure configuration 2, and each comb structure is configured with 2 different cyclic shift configurations. In this configuration, four reference signal sequences are configured on the same time-frequency resources. When the terminal device acquires the configuration information for the downlink measurement, it acquires the comb structure configuration in addition to the time-frequency resource configuration for the downlink measurement. The terminal device obtains the received power of the comb structure configuration 1 and the received power of the comb structure configuration 2 according to the time-frequency resource information and the comb structure configuration, as shown in FIG. 5.

In the case that the terminal device does not receive the sequence resource configuration information, that is, only the measurement time-frequency resource configuration information for downlink measurement is received, and the reference signal sequence resource configuration information is not received, the terminal device does not know the reference sequence resource configuration. At this time, the terminal device only measures the measurement time-frequency resources configured by the base station for downlink measurement and obtains the transmission power on the time-frequency resources.

In step S304, the terminal device feeds back the measurement result of the cross-link interference to the base station for further scheduling by the base station.

The feeding back the measurement result of the cross-link interference to the base station may include at least one of:

feeding back the measured RSRP or received signal strength directly, feeding back the degree of impact of the measured cross-link interference on a Modulation Coding Scheme (MCS) level, or feeding back an indication which indicates whether a terminal device is capable of being scheduled to receive downlink data on the current time-frequency resources.

Each will be described in detail below.

1. Feeding back the measured RSRP or received signal strength directly.

In this method, different feedback amounts are used for feedback according to the configuration of the downlink measurement time-frequency resources and of the sequence.

For example, if the reference signal sequence is directly configured, the possible feedback manners include:

1.a For each configured reference signal sequence, the measured RSRP of each reference signal sequence is fed back. When feeding back the RSRP, the quantized measurement value can be directly fed back, or an index corresponding to the measurement value can be fed back according to a pre-configured lookup table.

1.b The threshold is set in advance, and only the measurement value corresponding to the reference signal sequence above the threshold is fed back. Or, only the index value of the reference signal sequence above the threshold is fed back.

1.c A bitmap sequence corresponding to the reference signal sequence is fed back. The number of bits in the bitmap sequence is the configured number of sequences. If the measured RSRP of the corresponding indexed reference sequence is higher than the threshold, the bit in the phase position in the bitmap sequence is set to A; if the measured RSRP of the indexed reference sequence is lower than the threshold, the bit of the phase position in the bitmap sequence is set to B. Among them, A is bit 1 or bit 0, and B is bit 0 or bit 1.

Similarly, multiple thresholds can be set in advance and a feedback sequence corresponding to the reference signal can be fed back. The length of the sequence is the same as the number of the configured reference sequences, and the value range of each element in the sequence is related to the number of the preset thresholds. For example, if the number of the preset thresholds is N, the value range of each element in the feedback sequence is 0-N. The terminal device determines the value of the respective element according to a comparison between the corresponding reference signal sequence and the preset thresholds.

Figure 6:
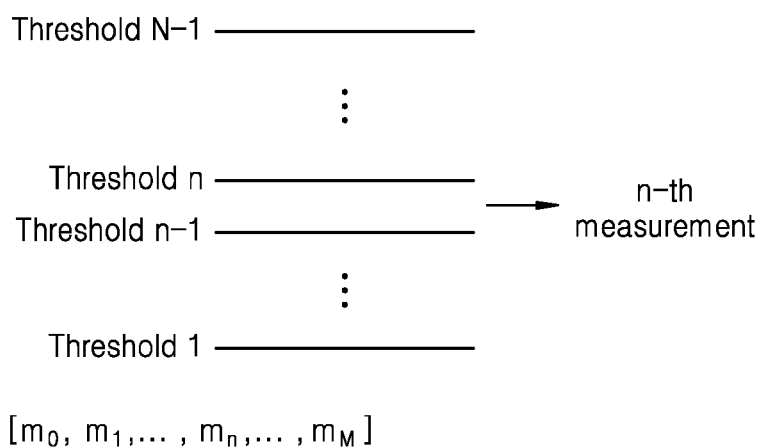
FIG. 6 schematically illustrates a measurement of a plurality of thresholds according to an embodiment of the present disclosure.

A simple example is shown in FIG. 6.

FIG. 6 schematically illustrates a measurement of a plurality of thresholds according to an embodiment of the present disclosure.

In FIG. 6, the value of the element in the feedback sequence corresponding to the m-th sequence is determined by comparing the RSRP measured on the reference signal having an index of m with the preset thresholds. The RSRP falls between the threshold n−1 and the threshold n, so the value of the corresponding element in the feedback sequence is n.

If measurement time-frequency resources and comb structures are configured, possible feedback manners include:

1.d The corresponding received power measurement value is fed back for each comb structure. The quantized value of the corresponding received power measurement value can be directly fed back, or the index corresponding to the measured value can be fed back according to a preset lookup table.

1.e A threshold is set in advance, and only the configuration index of the comb structure that has a received power measurement value higher than the threshold is fed back, or the received power measurement value of the corresponding comb structure is fed back.

1.f The corresponding bitmap sequence or feedback sequence is fed back, similar to manner 1.c.

If only time-frequency resources are configured, the possible feedback manners include:

1.g The received power measurement value of the time-frequency resources is fed back. The quantized value of the corresponding received power measurement value can be directly fed back, or the index corresponding to the measured value is fed back according to a preset lookup table.

1.h A threshold is set in advance, and an indication indicating whether the value measured on the measurement time-frequency resources is higher than the threshold is fed back.

1.i Multiple thresholds are set in advance, and the feedback value is determined based on the comparison between the measured value and the multiple thresholds.

2. Feeding back the degree of impact of the measured cross-link interference on MCS level Possible manners in this method include:

2.a The MCS level determined by taking the cross-link interference into account is fed back.

The terminal device determines the MCS level by taking the cross-link interference into account according to the measurement result obtained from the measurement and the measurement of the downlink reference signal and feeds back the MCS level.

Specifically, when cross-link interference is not considered, the terminal device determines the downlink MCS level only based on the measurement result of the downlink reference signal. However, it may take into account that cross-link interference may cause interference to the downlink, which affects the determination of the MCS level. Therefore, the terminal device calculates and determines a new MCS level based on the measurement result of the downlink reference signal (for example, the measurement result of CSI-RS or DMRS or SSB) along with the measurement result of cross-link interference, and feeds it back to the base station.

2.b The MCS level adjustment step determined by taking the cross-link interference into account is fed back.

In the foregoing manner, the MCS level determined by taking the cross-link interference into account is fed back directly. The required number of bits is the same as the number of feedback bits of the MCS level, and the required signaling overhead is large. In order to reduce the signaling overhead, the MCS level adjustment step can be fed back. The feedback may be performed by means of a look-up table, which specifies a relationship between an index (that is, a feedback bit combination) and an MCS level adjustment step in a preset manner. A simple lookup is shown in Table 1.

TABLE 1

| Index (decimal representation of bit combination) | MCS level adjustment step |
|---|---|
| 0 | unchanged or lowered |
| 1 | increase by 1 |
| 2 | increase by 2 |
| 3 | increase by 3 or more |

After measuring the cross-link interference, the terminal device determines the MCS level adjustment step according to the measurement result, selects an appropriate index from the lookup table, and feeds it back to the base station.

For different configuration methods of the measurement time-frequency resources and reference signal sequence, the manner for feeding back the MCS level or the MCS level adjustment step may include at least one of the following methods:

The MCS level or MCS level adjustment step corresponding to each reference sequence is fed back according to the configured reference sequence;

The MCS level or MCS level adjustment step corresponding to each comb structure is fed back according to the configured comb structure;

The MCS level or the MCS level adjustment step calculated for the configured downlink measurement time-frequency resources is fed back.

3. Feeding back an indication which indicates whether to continue to receive downlink data on the current time-frequency resource This method is equivalent to feedback an indication which indicates whether the terminal device is capable of being scheduled to receive downlink data on the current time-frequency resources, that is, whether it can operate in a full duplex mode. For each configured reference signal sequence, or comb structure, or time-frequency resources, only 1 bit of information can be fed back, which is used to indicate whether a terminal device that can transmit an uplink reference signal can be scheduled on the same time-frequency resources. This data is hereinafter referred to as instruction information.

For different configuration methods of the downlink measurement time-frequency resources and sequence, the feedback method may include the following:

3.a If downlink measurement time-frequency resources and reference signal sequences are configured, corresponding indication information is fed back for each configured reference signal sequence.

3.b If downlink measurement time-frequency resources and comb structures are configured, corresponding indication information is fed back for each configured comb structure.

3.c If the downlink measurement time-frequency resources are configured, the corresponding indication information of the time-frequency resources is fed back.

After the terminal device performs feedback, it waits for further scheduling information of the base station to perform downlink data reception.

In the above embodiment, a method for reducing cross-link interference in a cell generated between terminal devices having opposite transmission directions that are served on the same time-frequency resources in the same cell.

In the method, the base station configures reference signal resources (including reference signal time-frequency resources and/or reference signal sequence resources) for the uplink terminal device (that is, the terminal device performing uplink transmission); meanwhile, the base station configures measurement resources (including time-frequency resources for measurement and/or sequence resources for measurement) for the downlink terminal device (that is, the terminal device performing downlink transmission), where all available reference signal time-frequency resources configured for the uplink terminal device and all available measurement time-frequency resources configured for the downlink terminal device overlap each other. The uplink reference signal time-frequency resources configured for a single terminal device is a subset of all available reference signal time-frequency resources; the downlink measurement time-frequency resources configured for a single terminal device is a subset of all available measurement time-frequency resources.

The base station allocates periodic measurement resources and/or sequence resources to the terminal device receiving the downlink data. After receiving the configuration, the downlink terminal device periodically measures the cross-link interference on the measurement time-frequency resources and feeds back the corresponding measurement result. For a configuration manner of downlink measurement time-frequency resources and/or sequence resources, and a measurement and feedback manner, reference may be made to the description of the foregoing method 300.

Since the periodic measurement and feedback cannot reflect the sudden change of the channel, in the following embodiments, an aperiodic cross-link interference measurement and feedback method will be provided.

Aperiodic Downlink Measurement and Feedback

The terminal device that receives the downlink data is subject to the cross-link interference. By using the foregoing periodic measurement and feedback, it is convenient for the base station to reduce the impact of cross-link interference on downlink reception through scheduling and the like. However, when there are changes in the communication channel, especially sudden changes, periodic measurement and feedback often cannot reflect such changes in time, resulting in a decrease in the reliability of the downlink received data. At this time, through aperiodic downlink measurement and feedback, the impact of such sudden channel changes on data transmission can be reduced.

Specifically, the aperiodic downlink measurement and feedback can be triggered by a downlink terminal device or a base station. If it is triggered by a downlink terminal device, the downlink terminal device acts as follows:

sending a downlink measurement request on the uplink channel;

receiving downlink measurement time-frequency resource configuration information and/or sequence resource configuration information from the base station, where the measurement time-frequency resource configuration information and/or sequence resource configuration information received from the base station is configured by the base station in response to the downlink measurement request;

performing measurement on downlink measurement time-frequency resources configured by the base station; and feeding back the measurement result to the base station.

When measuring the cross-link interference, an uplink terminal device paired with a downlink terminal device needs to transmit a reference signal so that the downlink terminal device can perform the measurement. At this time, the uplink terminal device acts as follows:

receiving uplink reference signal time-frequency resource configuration information and/or reference signal sequence resource configuration information configured by the base station; and transmitting the reference signal on the time-frequency resources configured by the base station.

It should be noted that the measurement time-frequency resources configured for the downlink terminal device and the reference signal time-frequency resources configured for the uplink terminal device should overlap with each other. When the uplink terminal device transmitting a reference signal, the downlink terminal device should start the measurement.

Figure 7:
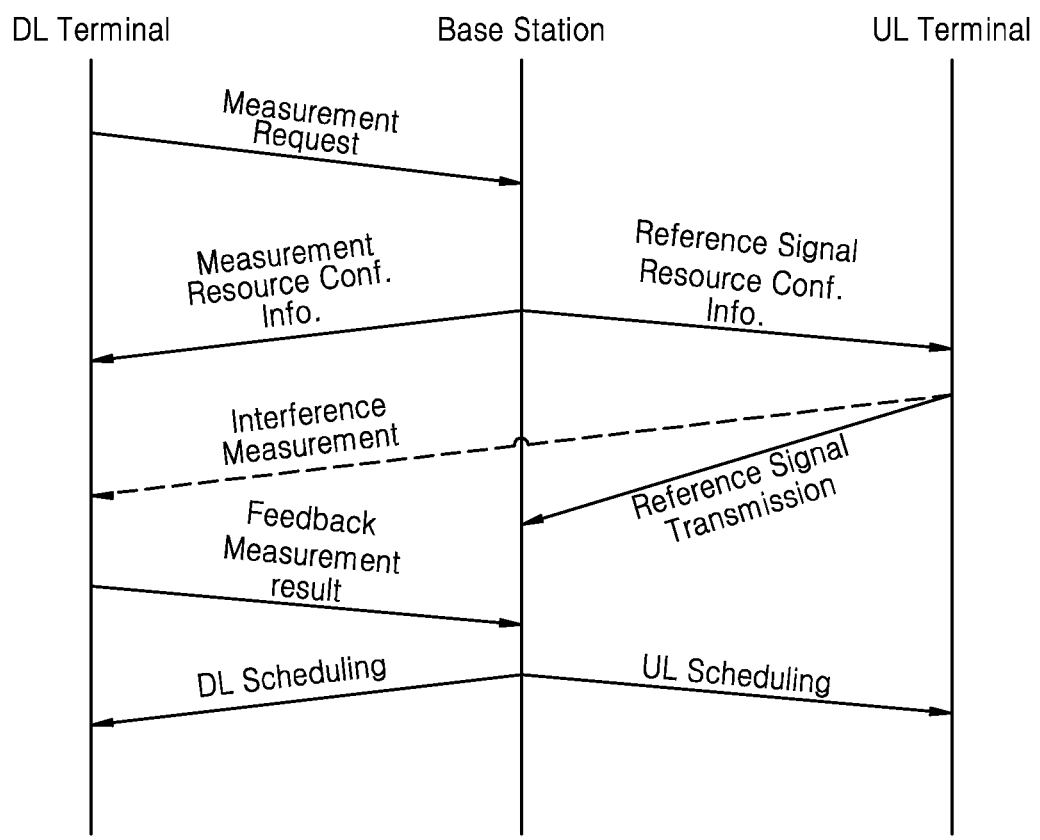
FIG. 7 schematically illustrates an aperiodic measurement and feedback manner according to an embodiment of the present disclosure.

The aforementioned aperiodic measurement and feedback method is shown in FIG. 7.

FIG. 7 schematically illustrates an aperiodic measurement and feedback manner according to an embodiment of the present disclosure.

The downlink terminal device transmits the downlink measurement request by:

transmitting the downlink measurement request in the uplink control channel or uplink shared channel. The measurement request may be 1-bit instruction information, which is used to inform the base station that the current terminal device needs to perform downlink measurement.

The time-frequency resource configuration information and/or reference signal configuration information may be received as follows.

For a downlink terminal device, the time-frequency resources and/or reference signal configuration information for downlink measurement is received in the downlink control information.

For the reference signal configuration information, the possible manners include:

a. Obtaining all configuration information of the reference signal sequence in the downlink control channel, including cyclic shift configuration information of the reference signal sequence, comb structure configuration information, and the like.

b. Obtaining part of the configuration information of the reference signal sequence in the downlink control channel, including the comb structure configuration information.

c. Not obtaining any reference signal configuration information.

For the uplink terminal device, all configuration information of the reference signal sequence for measurement needs to be received in the downlink control information.

For the feedback of the cross-link interference, it needs to be determined according to the specific sequence configuration mode, and all the methods listed in the foregoing embodiments can be used.

After the downlink terminal device completes the measurement and feedback of the cross-link interference, it receives the scheduling information of the base station and performs the subsequent data transmission process.

In another embodiment, the aforementioned aperiodic downlink measurement and feedback may also be triggered by a base station. In this case, the base station directly transmits time-frequency resource configuration information for measurement, and instructs the corresponding uplink terminal device to transmit a reference signal sequence on the corresponding time-frequency resources. After receiving the time-frequency resource configuration information, the uplink terminal device transmits a reference signal sequence on the corresponding time-frequency resource; after receiving the time-frequency resource configuration information, the downlink terminal device performs downlink measurement on the corresponding time-frequency resources and feeds back the corresponding measurement result.

Semi-Static Downlink Measurement and Feedback

For a downlink terminal device that operates in full duplex mode, it is still necessary to measure the paired uplink terminal device and feedback the corresponding measurement result. At this time, a semi-static configuration manner can be used to measure the cross-link interference caused by the paired uplink terminal device.

A possible implementation manner is that the downlink terminal device obtains configuration information of the semi-static measurement time-frequency resources from the system information or the downlink control channel. The time-frequency resource configuration information includes time-frequency resource location of the measurement resources, periodicity information, and the like.

The downlink terminal device obtains an activation instruction of the foregoing semi-static measurement time-frequency resources from the downlink control information. After receiving the activation instruction, measurement of cross-link interference is started on the semi-static measurement time-frequency resources configured by the base station, and the corresponding measurement result is fed back.

The downlink terminal device detects the downlink control information, and stops the measurement and feedback if a deactivation instruction of the semi-static measurement time-frequency resources is detected.

In another embodiment, the downlink terminal device obtains configuration information of the semi-static measurement time-frequency resources from the system information or the downlink control channel. The configuration information may include a time-frequency resource location of the measurement resources, a start time and an end time (or a valid time length) of the measurement resources, and a period within the valid time length.

After receiving the configuration information of the semi-static measurement time-frequency resources, the terminal device performs cross-link interference measurement within a valid time indicated in the configuration information, and feeds back corresponding measurement result.

In this way, the terminal device can monitor the downlink control information at the same time. If the downlink control information carries the deactivation indication of the semi-static measurement time-frequency resources, the measurement and feedback on the semi-static measurement time-frequency resources are stopped.

According to the method provided by the embodiment of the present disclosure, the impact of inaccurate cross-link interference measurement on downlink data transmission due to channel changes can be reduced, thereby improving the overall performance of the system.

Hereinafter, a method for determining the cross-link interference performed at a base station according to an embodiment of the present disclosure will be described with reference to FIG. 8.

Figure 8:
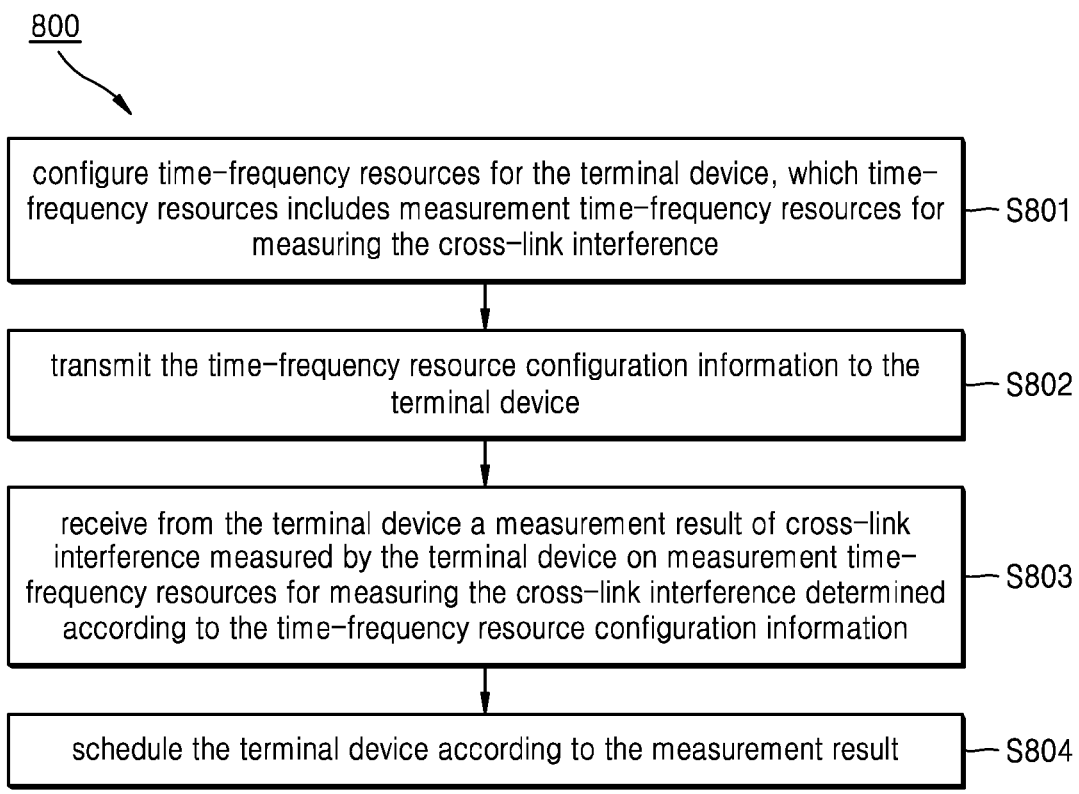
FIG. 8 schematically illustrates a flowchart of a method for determining cross-link interference performed at a base station according to an embodiment of the present disclosure.

FIG. 8 schematically illustrates a flowchart of a method 800 for determining the cross-link interference performed at a base station according to an embodiment of the present disclosure. For simplicity, details that have been described in detail in the corresponding method 300 for measuring the cross-link interference performed at a terminal device as described previously with reference to FIG. 3 are omitted here. For details, reference may be made to the foregoing description of the method 300.

As shown in FIG. 8, the method 800 may include steps S801 to S804.

In step S801, the base station may configure time-frequency resources for the terminal device. Here, the time-frequency resources may include measurement time-frequency resources for measuring the cross-link interference.

Further, in step S802, the base station may transmit the time-frequency resource configuration information to the terminal device.

Alternatively, or additionally, the base station may configure sequence resources for the terminal device in step S801 and transmits the sequence resource configuration information to the terminal device in step S802. Here, the sequence resource configuration information may include at least one of: a root sequence configuration of a used reference signal sequence, a cyclic shift configuration, and a comb structure configuration.

As described above, in an embodiment, step S801 may include configuring, as the measurement time-frequency resources, reference signal time-frequency resources for the terminal device.

In another embodiment, step S801 may include configuring a set of reference signal time-frequency resources and a resource index set indication for the terminal device. The terminal device can use the set of reference signal resources and the resource index set indication to determine reference signal time-frequency resources for uplink sounding and the measurement time-frequency resources for downlink measurement.

In an embodiment, step S801 may include at least one of:
configuring a period of the reference signal time-frequency resources as a period of the measurement time-frequency resources,
configuring a period of the measurement time-frequency resources separately, or
configuring time configuration information for the measurement time-frequency resources separately.

In step S803, the base station may receive from the terminal device a measurement result of cross-link interference measured by the terminal device on measurement time-frequency resources for measuring the cross-link interference determined according to the time-frequency resource configuration information.

In an embodiment, step S803 may include:
receiving an RSRP measurement measured by the terminal device according to a reference signal sequence or a set of reference signal sequences transmitted on the measurement time-frequency resources when the terminal device receives the sequence resource configuration information;
receiving received signal strength measured directly by the terminal device on the measurement time-frequency resources when the terminal device fails to receive the sequence resource configuration information.

The measurement result may include at least one of: the measured RSRP or received signal strength measured by the terminal device, the degree of impact of the measured cross-link interference on the MCS level, or an indication which indicates whether the terminal device is capable of being scheduled to receive downlink data on the current time-frequency resources.

In step S804, the base station may schedule the terminal device according to the measurement result.

In an embodiment, the method 800 may further include: receiving a downlink measurement request from the terminal device, wherein configuring the terminal device with time-frequency resources and/or sequence resources is performed by the base station in response to the downlink measurement request, that is, it is performed aperiodically.

In another embodiment, step S801 may be performed periodically or semi-statically.

The following describes the scheduling method of the base station in detail corresponding to the three measurement and feedback methods (periodic measurement and feedback, aperiodic measurement and feedback, and semi-static measurement and feedback) provided by the terminal device described previously.

Periodic Measurement and Feedback

The periodic measurement and feedback are mainly used to periodically measure the cross-link interference between the downlink terminal device and the uplink terminal device, so as to determine the pairing situation of the downlink terminal device and the uplink terminal device in the full duplex mode.

In this way, the base station maintains a terminal device list for each downlink terminal device, and records the interference of the uplink terminal device with which it may be paired on its downlink transmission.

One possible way is to establish a look-up table for each downlink terminal device. The look-up table includes, for the downlink terminal device, the terminal device or terminal device group that can be paired with the downlink terminal device for uplink transmission, and the measurement result obtained by the downlink terminal device measuring the cross-link interference caused by the corresponding downlink terminal device or terminal device group during uplink transmission.

In this manner, the base station performs scheduling of the uplink terminal device and the downlink terminal device according to the measurement result of the cross-link interference in the lookup table. Specifically, the base station selects an uplink terminal device paired with the downlink terminal device based on a cross-link interference measurement result from a lookup table established for each downlink terminal device according to a preset rule and performs scheduling and data transmission. The measurement result is obtained by a downlink terminal device performing measurement feedback on the downlink measurement time-frequency resources configured by the base station.

The preset criteria may include the following:

1. Selecting an uplink terminal device with the lowest cross-link interference measurement value, pairing it with the aforementioned downlink terminal device, and providing services on the same time-frequency resources.

For this criterion, a first threshold can be set in advance. If the lowest value of the interference measurement value is greater than the first threshold, it means that the downlink terminal device does not have a suitable matched uplink terminal device according to the current measurement result, so the downlink terminal device is scheduled to receive downlink data on time-frequency resources in a half-duplex mode.

2. Setting a second threshold in advance, selecting an uplink terminal device whose cross-link interference measurement value is lower than the second threshold in the lookup table, pairing it with the downlink terminal device, and providing services on the same time-frequency resources. If there is no uplink terminal device in the lookup table whose cross-link interference measurement value is lower than the second threshold, it means that the downlink terminal device does not have a suitable matched uplink terminal device according to the current measurement result, so the downlink terminal device is scheduled to receive downlink data on time-frequency resources in a half-duplex mode.

The foregoing lookup table is established in the following manner: the base station receives the downlink measurement result fed back by the downlink terminal device, determines the corresponding uplink terminal device or terminal device group according to the configured downlink measurement time-frequency resources and/or sequence resources, and updates or adds the corresponding measurement result in the lookup table.

In another embodiment, the base station maintains an uplink terminal device list for each downlink terminal device, and the list records an uplink terminal device(s) that can be paired with the downlink terminal device. The uplink terminal device list is established in the following manner: a third threshold is set in advance; the base station receives measurement feedback on the cross-link interference from the downlink terminal device; and the base station determines the uplink terminal device or terminal device group that generate the cross-link interference according to the configured downlink measurement time-frequency resources and/or sequence resources; the base station compares the feedback measurement result with the third threshold, and adds the uplink terminal device or terminal device group to the uplink terminal device list of the downlink terminal device if it is lower than the third threshold; if it is higher than the third threshold, does not add the uplink terminal device or terminal device group to the uplink terminal device list of the downlink terminal device or remove from the uplink terminal device list of the downlink terminal device.

The base station selects an uplink terminal device paired with the downlink terminal device for scheduling according to the uplink terminal device list of the downlink terminal device. For example, an uplink terminal device is randomly selected with equal probability to be paired with the downlink terminal device in the uplink terminal device list of the downlink terminal device; or, the uplink terminal device with the smallest measurement result in the uplink terminal device list of the downlink terminal device is selected to be paired with the downlink terminal device; or, a recently added uplink terminal device is selected from the uplink terminal device list of the downlink terminal device for pairing.

If there is no terminal device in the uplink terminal device list of the downlink terminal device (that is, the table is empty), it means that the downlink terminal device does not have a suitable matched uplink terminal device according to the current measurement result, so the downlink terminal device is scheduled to receive downlink data on time-frequency resources in a half-duplex mode.

The periodic feedback and measurement can be used for the establishment and long-term maintenance of the uplink terminal device list or the lookup table. Considering that sudden channel changes cannot be tracked by the periodic feedback and measurement, aperiodic measurement and feedback are needed to supplement it.

Aperiodic Measurement and Feedback

As mentioned above, aperiodic measurement and feedback are mainly used to measure the change in cross-link interference when the interference channel between a paired downlink terminal device and uplink terminal device changes. The aperiodic measurement and feedback can be triggered by the downlink terminal device or by the base station.

When it is triggered by a downlink terminal device, the base station receives an aperiodic measurement request transmitted by the downlink terminal device. After receiving the aperiodic measurement request, the base station allocates measurement time-frequency resources and sequences, transmits configuration information of the measurement time-frequency resources and/or sequences to the downlink terminal device through the downlink control channel, and simultaneously transmits the corresponding configuration information of the measurement time-frequency resources and/or sequences to the uplink terminal device through the downlink control channel. The base station receives the measurement result information transmitted by the downlink terminal device, determines whether the level of cross-link interference has changed, and performs subsequent scheduling process.

The determining whether the level of cross-link interference has changed and performing subsequent scheduling process includes:

Setting the fourth threshold in advance. If the base station uses the foregoing manner of maintaining an uplink terminal device lookup table, the fourth threshold may be the same as the foregoing first or second threshold or may be different. If the feedback measurement result received by the base station from the downlink terminal device is lower than the fourth threshold, the current downlink terminal device and the uplink terminal device can still be paired for scheduling, and the measurement result of the corresponding uplink terminal device in the lookup table is updated. If the feedback measurement result received by the base station from the downlink terminal device is higher than the fourth threshold, the uplink terminal device lookup table of the downlink terminal device is updated, and the updated lookup table is searched for the uplink terminal device for new scheduling that meets the foregoing conditions and can be paired with the downlink terminal device. If there is no uplink terminal device in the lookup table that meets the foregoing conditions and can be paired with the downlink terminal device, it means that the downlink terminal device does not have a suitable matched uplink terminal device according to the current measurement result, so the downlink terminal device is scheduled to receive downlink data on time-frequency resources in a half-duplex mode.

If the base station uses the foregoing manner of maintaining an uplink terminal device list, the fourth threshold may be the same as or different from the foregoing third threshold. The feedback measurement result received by the base station from the downlink terminal device is compared with the fourth threshold. if the measurement result is lower than the fourth threshold, the current downlink terminal device and the uplink terminal device may still be paired for scheduling; if the measurement result is higher than the fourth threshold, the uplink terminal device is removed from the uplink terminal device list (that is, the uplink terminal device list is updated), and a new uplink terminal device is selected from the uplink terminal device list for pairing scheduling with the downlink terminal device. If the uplink terminal device list is empty after updating the uplink terminal device list, it means that the downlink terminal device does not have a suitable matched uplink terminal device according to the current measurement result, so the downlink terminal device is scheduled to receive downlink data on time-frequency resources in a half-duplex mode.

For the aperiodic measurement and feedback triggered by the base station, the trigger condition may be that the base station receives feedback information of the downlink data received by the downlink terminal device paired with the uplink terminal device. If it is found that the current MCS level is used, the hybrid automatic retransmission feedback information is Negative Acknowledgment (NACK), and the number of retransmissions exceeds a predetermined threshold, it is considered that there is a problem with the current pairing of the downlink terminal device and the uplink terminal device, thereby initiating aperiodic measurement and feedback, and transmitting downlink measurement time-frequency resources on the downlink control channel. The subsequent process is the same as the aperiodic measurement and feedback initiated by the terminal device and is not repeated here.

Semi-Static Measurement and Feedback

In addition to periodic and aperiodic measurement and feedback, semi-static feedback can be used to detect the strength of interference between a paired downlink terminal device and uplink terminal device.

When using semi-static measurement and feedback, the base station configures semi-static measurement time-frequency resources and/or reference signal sequence resources for the downlink terminal device through the downlink control channel, and configures semi-static reference signal time-frequency resources and sequence resources for the corresponding uplink terminal device through the downlink control channel. The base station receives the measurement result feedback obtained by the downlink terminal device by measuring on the corresponding semi-static resources and compares the measurement result with a predetermined threshold. If it is lower than the threshold, the current downlink terminal device and the uplink terminal device can still be paired for scheduling; if the measurement result is higher than the threshold, a new uplink terminal device is selected to be paired with the downlink terminal device for scheduling according to the foregoing rules, a semi-static measurement resource deactivation indication is transmitted in the downlink control channel to stop the corresponding semi-static measurement and feedback.

The action of the base station and the action of the terminal device in the aforementioned different states can be described as follows.

After the terminal device has accessed, it continuously performs periodic measurement and feedback to measure the cross-link interference generated by different uplink terminal devices when the terminal device receives downlink data. At this time, the different measurement units allocated to the same downlink terminal device may be allocated to different uplink terminal devices for transmitting uplink reference signals, as shown in FIG. 9.

Figure 9:
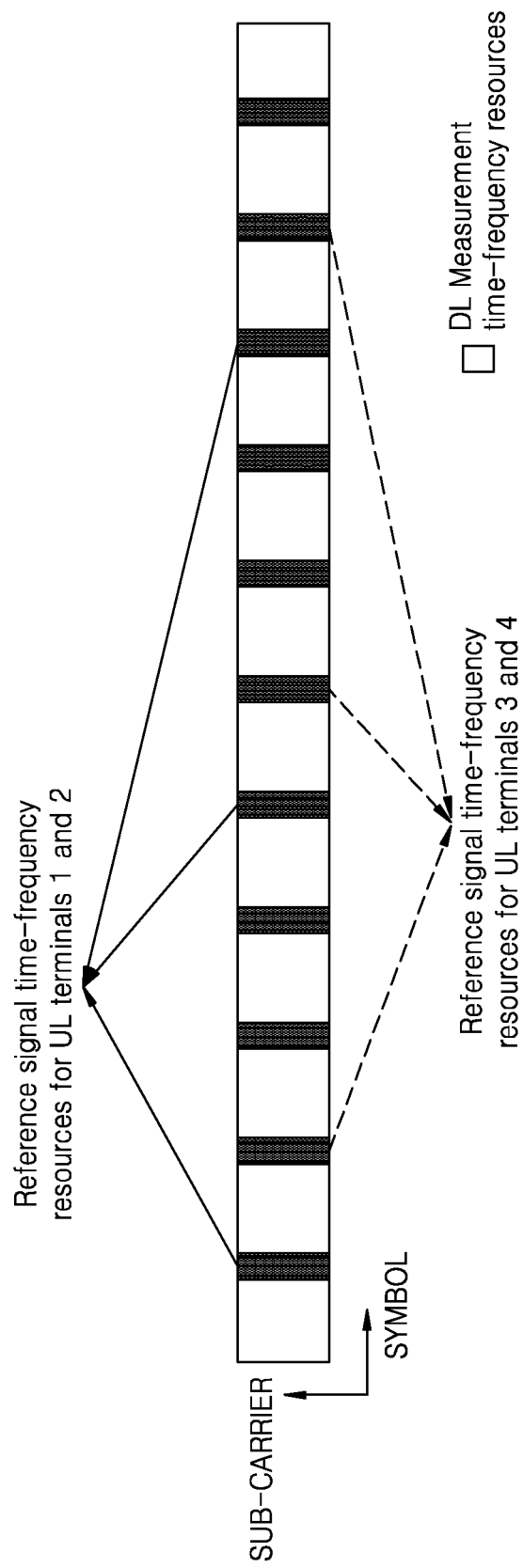
FIG. 9 schematically illustrates a diagram of measuring cross-link interference of different terminal devices according to an embodiment of the present disclosure.

FIG. 9 schematically illustrates a diagram of measuring cross-link interference of different terminal devices according to an embodiment of the present disclosure.

In this process, the base station continuously updates the uplink terminal device list of the terminal device, and searches for a terminal device that can be paired with downlink reception of the terminal device for uplink data transmission. If a corresponding terminal device is found, the downlink reception of the terminal device and the uplink data transmission of the searched terminal device can be scheduled on the same time-frequency resources, so the base station operates in a full-duplex mode.

At this time, the semi-static test time-frequency resources and/or sequence resources may be allocated to the downlink terminal device, so as to monitor cross-link interference caused by the paired terminal device.

The base station and/or the downlink terminal device may also initiate aperiodic measurement and feedback when the triggering conditions are met, to monitor the sudden changes in the interference link between the paired terminal device and the downlink terminal device.

During the scheduling process, periodic measurement and feedback are still performed to continuously update the uplink terminal device list. The base station can adjust the period in the downlink control information or system information to increase the feedback period and reduce signaling overhead.

If during the scheduling process, it is found that the current pairing is no longer suitable through semi-static or aperiodic measurement and feedback, a new uplink terminal device is selected from the terminal device list for pairing with the downlink data reception of the terminal device. If there is no terminal device in the uplink terminal device list that meets the foregoing rule, the downlink data reception of the terminal device is scheduled to half-duplex resources until a suitable paired uplink terminal device is found.

A manner of inter-cell interference coordination according to an embodiment of the present disclosure will be described below.

In the scenario assumed by this embodiment, the system uses a flexible time division duplex frame structure configuration. Due to factors such as service types or data requirements of terminal devices, neighboring cells are configured with different transmission directions on the same time-frequency resources, which results in cross-link interference between terminal devices at the cell edge. A simple explanation is as follows.

Cell 1 is scheduled for downlink transmission at time N, and neighboring cell 2 is scheduled for uplink transmission on the same time-frequency resources. At this time, cross-link interference will occur between terminal devices at the edge of the two cells. Specifically, the uplink data transmission of the terminal device B in the cell 2 may interfere with the downlink data reception of the terminal device A in the cell 1.

For the interference, the impact of the interference on the downlink data reception can be reduced through inter-cell cooperation. One possible way is to share time-frequency resources of the uplink sounding reference signal between cells, and configure the measurement time-frequency resources for the downlink terminal device in the downlink cell to measure the inter cell interference caused by the adjacent uplink cell to the cell edge terminal device. The measurement time-frequency resources configured by the downlink cell for the downlink terminal device overlaps with the uplink sounding reference signal resources of at least one adjacent uplink cell.

The measurement time-frequency resources configured by the downlink cell for the downlink terminal device may be dedicated to the terminal device. For example, for the cell center terminal device, the foregoing measurement time-frequency resources are not configured, and for the cell edge terminal device, it is determined whether to configure the foregoing measurement time-frequency resources for the cell edge terminal device according to the transmission direction of the neighboring cell.

Figure 10:
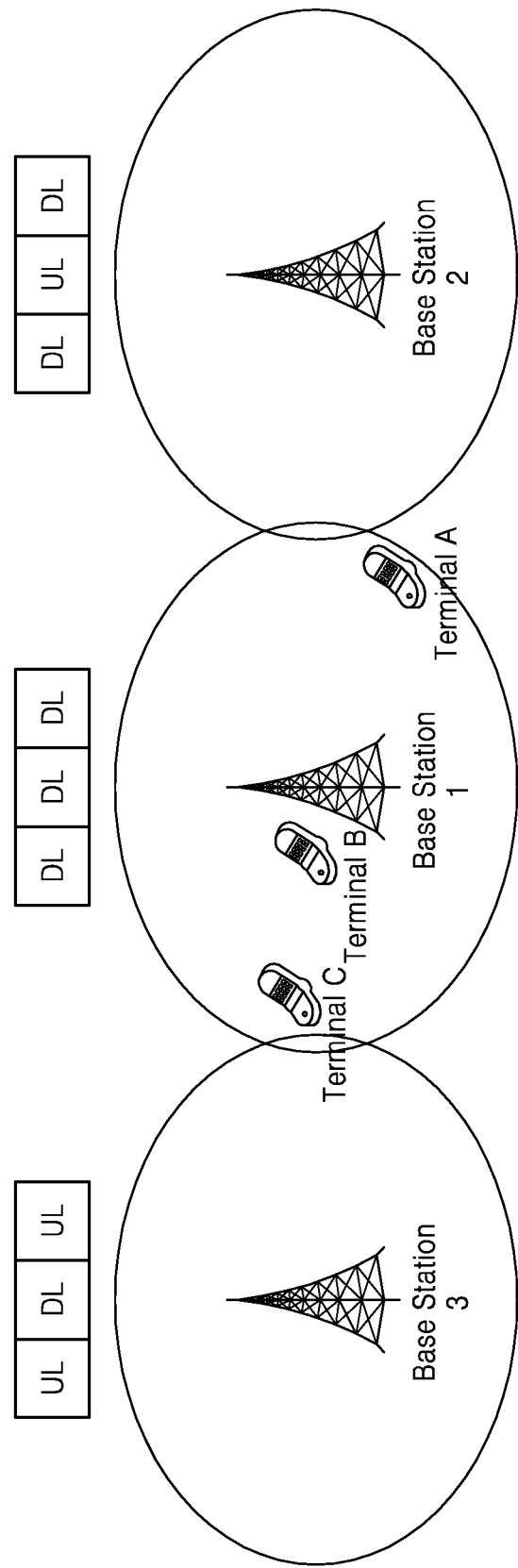
FIG. 10 schematically illustrates a configuration manner of downlink measurement time-frequency resources according to an embodiment of the present disclosure.

FIG. 10 shows a simple example.

FIG. 10 schematically illustrates a configuration manner of downlink measurement time-frequency resources according to an embodiment of the present disclosure.

Referring to FIG. 10, all three time slots of the base station 1 are downlink time slots and serve three terminal devices A, B, and C at the same time. The terminal device B is located at the cell center of the cell 1, so no measurement time-frequency resource is configured for the terminal device. Terminal device A is located at the cell edge of the serving cells of base station 1 and base station 2, and it is determined whether to configure measurement time-frequency resources according to the transmission direction of base station 2. The three slot transmission directions of base station 2 are: downlink, uplink, and downlink. It can be seen that the transmission directions of the base station 1 and the base station 2 in time slot 2 are different, so the terminal device A is configured with measurement the time-frequency resources in time slot 2. The terminal device C is located at the cell edge of the serving cells of the base station 1 and the base station 3, and it is determined whether to configure the measurement time-frequency resources according to the transmission direction of the base station 3. The three timeslot transmission directions of the base station 3 are: uplink, downlink, and uplink. The transmission directions are different from the transmission direction of the base station 1 in time slots 1 and 3. Therefore, the base station 1 configures measurement time-frequency resources for the terminal device C in time slots 1 and 3.

In another implementation manner, the measurement time-frequency resources of the downlink base station are configured according to whether the terminal device is located at a cell edge. If the terminal device is located at the cell edge, the terminal device is configured with measurement time-frequency resources in the downlink time slot or symbol; if the terminal device is located at the cell center, no measurement time-frequency resource is configured.

The foregoing measurement time-frequency resources may be sent and notified in a downlink control channel and may also be sent and notified in the system information. After receiving the configuration information of the measurement time-frequency resources, the terminal device performs measurement on the corresponding time-frequency resources and feeds back the corresponding measurement result.

The feedback measurement result may be a directly quantified RSRP, or a corresponding index value may be determined using a corresponding lookup table according to the measurement result and fed back.

After receiving the feedback from the downlink terminal device, the base station may transmit the feedback measurement result to the base station that generates cross-link interference through the backhaul link.

In another embodiment, the base station compares the feedback of the downlink terminal device with a preset threshold. If the feedback result is lower than the threshold, it means that the inter-cell cross-link interference caused by the neighboring base station is low and insufficient to affect the reception of downlink data, and the feedback result is not transmitted to the base station causing the interference; if the feedback result is higher than the threshold, it means that the inter-cell cross-link interference received by the downlink terminal device is serious, and the base station transmits the corresponding feedback result to the corresponding base station through the backhaul link.

In addition, rather than directly transmitting the feedback result to the corresponding interfering base station, the current base station may transmit instruction information indicating whether there is inter-cell cross-link interference, to notify the interference situation of the neighboring interfering base station.

When the neighboring base station receives the indication information or measurement result transmitted by the current base station through the backhaul link, it can choose a scheduling mode to reduce inter-cell cross-link interference on the downlink terminal device in the neighboring cell.

In another embodiment, new reference signal time-frequency resources and reference signal sequences may be defined, which are specifically used for measurement of inter-cell cross-link interference. In this way, the current base station transmits configuration information to the downlink terminal device and configures time-frequency resources for measurement. In a cell that is served by the interfering base station, the base station configures reference signal time-frequency resources and corresponding reference signal sequences. It should be noted that the time-frequency resources for measurement and the reference signal time-frequency resources overlap each other.

In addition to the configuration information, the foregoing process can be used for the interaction between the base station and the terminal device.

The structure of a terminal device according to an embodiment of the present disclosure will be described below with reference to FIG. 11.

Figure 11:
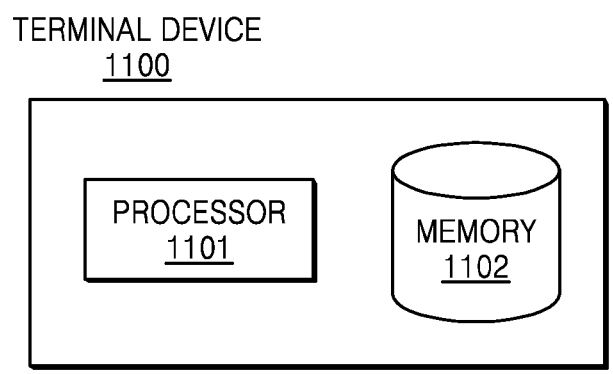
FIG. 11 schematically illustrates a structural block diagram of a terminal device according to an embodiment of the present disclosure.

FIG. 11 schematically illustrates a structural block diagram of a terminal device 1100 according to an embodiment of the present disclosure. The terminal device 1100 may be used to perform the method 300 as described previously with reference to FIG. 3.

As shown in FIG. 11, the terminal device 1100 includes: a processing unit or a processor 1101, which processor 1101 may be a single unit or a combination of multiple units for performing different steps of a method; a memory 1102, which stores a computer executable instructions that, when executed by the processor 1101, cause the terminal device 1100 to perform the method 300. For simplicity, only the schematic structure of a terminal device according to an embodiment of the present disclosure is described herein, and details that have been described in detail in the method 300 described previously with reference to FIG. 3 are omitted.

Figure 12:
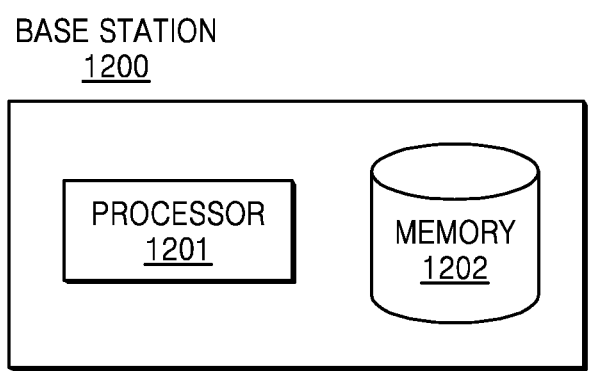
FIG. 12 schematically illustrates a structural block diagram of a base station according to an embodiment of the present disclosure.

The structure of a base station according to an embodiment of the present disclosure will be described below with reference to FIG. 12. FIG. 12 schematically illustrates a structural block diagram of a base station 1200 according to an embodiment of the present disclosure. The base station 1200 may be configured to perform the method 800 as previously described with reference to FIG. 8.

As shown in FIG. 12, the base station 1200 includes: a processing unit or a processor 1201, which processor 1201 may be a single unit or a combination of multiple units for performing different steps of the method; a memory 1202, which stores computer-executable instructions that, when executed by the processor 1101, cause the base station 1200 to perform the method 800. For simplicity, only the schematic structure of a base station according to an embodiment of the present disclosure is described herein, and details that have been described in detail in the method 800 described previously with reference to FIG. 8 are omitted.

In addition, in order to overcome the problem of a long access delay existing in the existing wireless communication technology, according to an embodiment of the present disclosure, there is provided a physical random access channel, and the physical random access channel may include a random access preamble and a cyclic prefix of the random access preamble, wherein a sub-carrier space corresponding to the random access preamble is lower than 1.25 KHz.

As for a general physical random access channel, a sub-carrier space is equal to 1.25 KHz. As for the physical random access channel according to the embodiment of the present disclosure, the sub-carrier space is lower than 1.25 KHz, that is, the sub-carrier space is reduced. Since a reciprocal of the sub-carrier space is a length of the random access preamble, the length of the random access preamble is increased. Increasing the length of the random access preamble makes a probability, in which the random access preamble is identified, be increased so as to increase a success rate of performing a random access by using the random access preamble.

The physical random access channel according to the embodiment of the present disclosure is applicable to a full-duplex system, to support the adjacent cells to transmit a longer random access preamble on an identical physical random access channel (PRACH) resource, so as to improve a resource usage rate and a random access success rate.

As an example, the sub-carrier space can be equal to 1 KHz. In this case, as illustrated in the description with reference to FIG. 13 below, the physical random access channel further includes a pre guard period, and the pre guard period and the cyclic prefix of the random access preamble are located in a transmission time interval prior to the transmission time interval where the random access preamble is located.

As an example, the sub-carrier space may be higher than 1 KHz and lower than 1.25 KHz. In this case, as illustrated in the description with reference to FIG. 14 below, the physical random access channel further includes the pre guard period and the post guard period, and a sum of lengths of the following items is 1 ms or 30720 Ts: the pre guard period, the cyclic prefix of the random access preamble, the random access preamble, and the post guard period. Here, 1 Ts indicates $1/(30.72*10^6)$ seconds.

According to another embodiment of the present disclosure, there is provided a random access preamble allocation method, which includes: configuring a random access preamble, wherein a sub-carrier space corresponding to the configured random access preamble is lower than 1.25 KHz. The characteristic of the random access preamble can be implemented by referring to the above embodiment. The random access preamble allocation method can be performed through a network layer for parameter allocation.

Figure 14:
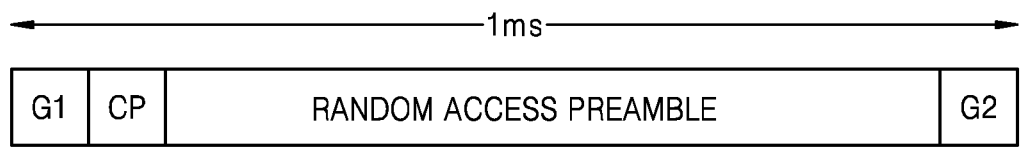
FIG. 14 illustrates a diagram of a physical random access channel according to an exemplary of the present disclosure.

More particularly, the embodiment shown in FIG. 14 may include one of the following cases: a length of the pre guard period is equal to a length of the cyclic prefix of the random access preamble, and a length of a post guard period is zero; the length of the pre guard period is equal to the length of the cyclic prefix of the random access preamble, and a difference between a sum of lengths, which include a length of the post guard period and a length of the cyclic prefix of a first OFDM symbol of the transmission time interval subsequent to the transmission time interval where the random access preamble is located, and the length of the cyclic prefix of the random access preamble is smaller than or equal to 2 Ts (for example, 0 Ts); and the length of the post guard period is equal to the length of the cyclic prefix of the random access preamble. When the length of the post guard period is zero, the cyclic prefix of the first OFDM symbol of the transmission time interval subsequent to the transmission time interval, where the random access preamble is located, functions as the post guard period of the random access preamble.

A specific structure of the physical random access channel according to the embodiment of the present disclosure will be described in details below.

Figure 13:
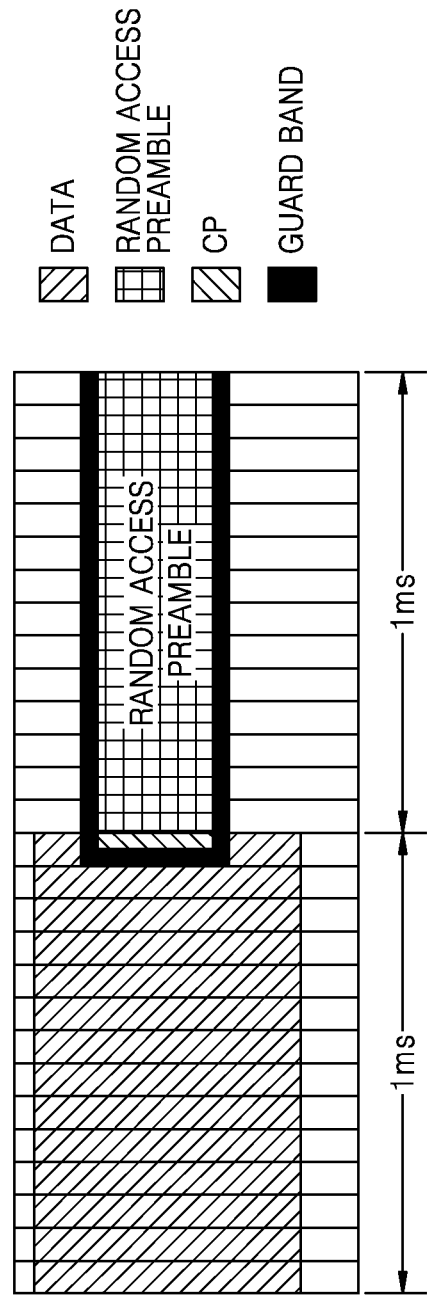
FIG. 13 illustrates a diagram of at least one portion of a frame including a random access preamble according to an exemplary of the present disclosure.

FIG. 13 shows a diagram of at least one portion of a frame including a random access preamble according to an embodiment of the present disclosure.

In FIG. 13, a horizontal coordinate indicates time (a time domain), and a vertical coordinate indicates a frequency (a frequency domain). FIG. 13 includes the physical random access channel according to the embodiment of the present disclosure, and the physical random access channel included in FIG. 13 at least is applicable to a random access of a small cell, for example, applicable to a cell of which a radius is smaller than the small cell.

As shown in FIG. 13, the transmission time interval may be 1 millisecond (ms), CP is a cyclic prefix of the random access preamble, a guard band may be configured on the frequency domain, and the guard period can be configured on the time domain. Structure parameters of the physical random access channel according to the embodiment of the present disclosure are shown in the following Table 2.

TABLE 2

| Sub-carrier space | Random access preamble length | Resource bandwidth of PRACH |
|---|---|---|
| 1 KHz | 1 ms | 1.08 MHz |
| Guard band on frequency domain | ZC sequence length | Length and location of cyclic prefix |
| Bandwidth of each of two guard bands is 23 KHz | 1049 | Occupying 0.5 OFDM symbols, namely, the last 0.5 OFDM symbols within a previous 1 ms |

With reference to Table 2, structure parameters of PRACH of the embodiment of the present disclosure are explained below:

(1) Resource Bandwidth of PRACH

In order to ensure there still exist sufficient resources allocated to a user to perform the random access in the case of the smallest system bandwidth, similar to a long term evolution (LTE) or new radio (NR) system, a bandwidth carrying the PRACH resource of the random access preamble (that is, a resource bandwidth of the PRACH) is still designed to be 1.08 MHz.

(2) Sub-Carrier Space and Length of Random Access Preamble

A cyclic prefix on an orthogonal frequency division multiplexing (OFDM) symbol of a conventional data (for example, the data in FIG. 13) is usually 5 μs (microsecond). The length of the post guard period is enabled to be zero, and the cyclic prefix of the first OFDM symbol of the transmission time interval subsequent to the transmission time interval for transmitting the random access preamble is enabled to function as the post guard period of the random access preamble.

As an example, it is also possible to make a latter half of the last OFDM symbol within the previous transmission time interval prior to the transmission time interval for transmitting the random access preamble be used for transmitting the cyclic prefix of the random access preamble and make a first half of the last OFDM symbol be used as the pre guard period. Adopting a frame structure shown in FIG. 13 to perform a random access can make a covering radius at least reach 700 m, even reach 750 m, so that a coverage requirement of the small cell with a radius of 500 m or the cell of which the radius is smaller than that of the small cell can be met.

Accordingly, the random access preamble according to the embodiment of the present disclosure may not retain the guard period of the random access preamble in an LTE system or an NR system within the transmission time interval for transmitting the random access preamble, so that a longer time domain range may be reserved for the random access preamble. Since the longer the random access preamble is, the easier the random access preamble is to be detected, the random access preamble according to the embodiment of the present disclosure may be detected more easily.

In addition, there is an orthogonality between the sub-carrier space of the conventional data and the sub-carrier space of the random access preamble, that is to say, the sub-carrier space $\Delta f_{data}$ of the conventional data and the sub-carrier space $\Delta f_{preamble}$ of the random access preamble satisfy: $\Delta f_{data} = K \times \Delta f_{preamble}$, wherein K is a positive integer, the sub-carrier space $\Delta f_{preamble}$ is a reciprocal of a random access preamble length $T_{SEQ}$, for example, when the random access preamble length $T_{SEQ}$ is 1 ms, the sub-carrier space $\Delta f_{preamble}$ is 1 kHz.

(3) Length and Location of the Cyclic Prefix

Configuring the cyclic prefix is an effective means against a multi-path effect, and whatever a radius of the cell is, the cyclic prefix should be retained, and a length of the cyclic prefix is at least the greatest time delay spread of a spatial propagation channel.

In order to maximize the detection ability for the random access preamble, the length of the random access preamble may be designed to be 1 ms. As shown in FIG. 13, the length of the cyclic prefix of the random access preamble may be designed to be 0.5 conventional OFDM symbol, and disposed at the latter half of the last symbol in the transmission time interval prior to the transmission time interval for transmitting the random access preamble, and the first half of the last symbol serves as the guard period.

(4) Guard Band and ZC (which is Zadoff-Chu, and is Called ZC for Short) Sequence Length on the Frequency Domain.

In order to distinguish the random access preamble from the conventional data or other data, and to protect the random access preamble, the guard band designed in the LTE system or the NR system may be used, the ZC sequence length $N_{ZC}$ may be designed to be greater than 839, for example, $N_{ZC}=1049$. Compared with the ZC sequence with a length of 839 in the LTE system or the NR system, the ZC sequence length in the present embodiment may at least increase 25%, and accordingly, a detection performance may at least be improved by 10% in theory.

As described above, the cyclic prefix of the random access preamble may be located within the last OFDM symbol of the transmission time interval prior to the transmission time interval where the random access preamble is located; a portion of the last OFDM symbol of which the time is previous to that of another portion serves as the pre guard period of the random access preamble; and the other portion of the last OFDM symbol serves as the cyclic prefix.

It should be understood that the above description is only used to facilitate explanation of the present disclosure, and is not used to limit the protection scope of the present disclosure, and in the case where the sub-carrier space corresponding to the random access preamble is enabled to be lower than 1.25 KHz, various manners may be adopted to configure the physical random access channel.

FIG. 14 shows a diagram of a physical random access channel according to an embodiment of the present disclosure.

As shown in FIG. 14, the physical random access channel according to the embodiment of the present disclosure may include a pre guard period G1, a post guard period G2, a cyclic prefix CP and a random access preamble, wherein a sub-carrier space corresponding to the random access preamble is higher than 1 KHz and lower than 1.25 KHz.

Table 3 shows six configuration manners of the physical random access channel in the case where the sub-carrier space corresponding to the random access preamble is higher than 1 KHz and lower than 1.25 KHz.

TABLE 3

| Configuration | Random access preamble length | Sub-carrier space | CP length | Length of pre guard period |
|---|---|---|---|---|
| 0 | 26624 Ts | 1.154 kHz | 2048 Ts | 2048 Ts |
| 1 | 26624 Ts | 1.154 kHz | 1418 Ts | 1418 Ts |
| 2 | 26624 Ts | 1.154 kHz | 2048 Ts | 0 |
| 3 | 28672 Ts | 1.071 kHz | 1024 Ts | 1024 Ts |
| 4 | 28672 Ts | 1.071 kHz | 736 Ts | 736 Ts |
| 5 | 28672 Ts | 1.071 kHz | 1024 Ts | 0 |

In the six configurations including Configuration 0 to Configuration 5, a sum of a length of the random access preamble, a length of the cyclic prefix of the random access preamble, a length of the pre guard period, and a length of the post guard period is a specific value (for example, 30720 Ts). When the length of the random access preamble is determined, the length of each of the cyclic prefix, the pre guard period and the post guard period can be flexibly allocated according to a practical requirement. Lengths of at least two of the cyclic prefix, the pre guard period, and the post guard period can be broadcast in the cell through a broadcasting manner.

With reference to Table 3, in Configuration 0 and Configuration 3, a difference between the length of the cyclic prefix of the random access leading sequence and the length of the pre guard period is smaller than or equal to 2 Ts (for example, 0 Ts), and the length of the post guard period is zero; and in this case, the cyclic prefix of the first OFDM symbol of the transmission time interval subsequent to the transmission time interval where the random access preamble is located may perform a function of the post guard period of the random access preamble. Accordingly, the configured PRACH may not include the post guard period, but includes the pre guard period and the cyclic prefix of the random access preamble, and a time domain length of the pre guard period is equal to a time domain length of the cyclic prefix of the random access preamble. Configuration 0 and Configuration 3 are applicable to a scene where a radius of the cell is very small (for example, smaller than 500 m).

In Configuration 1 and Configuration 4, the PRACH may include the pre guard period, the cyclic prefix of the random access preamble, and the post guard period, a difference between the length of the pre guard period and the length of the cyclic prefix of the random access preamble is smaller than or equal to 2 Ts (for example, 0 Ts), and a difference between a sum of lengths, which include the length of the post guard period and the length of the cyclic prefix of the first OFDM symbol of the subsequent transmission time interval, and the length of the cyclic prefix of the random access preamble is smaller than or equal to 2 Ts (for example, 0 Ts). Configuration 1 and Configuration 4 are applicable to a scene where a radius of the cell is a little larger (for example, larger than a radius of the cell where Configuration 0 and Configuration 3 are applicable).

In Configuration 2 and Configuration 5, the PRACH may not include the pre guard period (that is, the length of the pre guard period is zero), the difference between the length of the post guard period and the length of the cyclic prefix of the random access preamble is smaller than or equal to 2 Ts (for example, 0 Ts), and the configurations are applicable to a scene where a radius of the cell is larger (larger than the radius of the cell where Configuration 1 and Configuration 4 are applicable).

In the embodiment of the present disclosure, there are provided various PRACHs. When performing the random access, the method and procedure in the LTE system or the NR system may be used for performing the access.

In addition, when the PRACH according to the embodiment of the present disclosure is used, it is further necessary to consider the problem of interference.

Particularly, for example, in the embodiment shown in FIG. 13, the cyclic prefix of the random access preamble is located within the transmission time interval prior to the transmission time interval for transmitting the random access preamble, and when the base station schedules another terminal to perform uplink and downlink data transmissions within a previous transmission time interval (the transmission time interval prior to the transmission time interval for transmitting the random access preamble), there may be resource overlap between the data of the last OFDM symbol of the previous transmission time interval and the cyclic prefix of the random access preamble. When there is the resource overlap, the uplink and downlink data transmissions will be interfered by the cyclic prefix of the random access preamble. An interference case is described with reference to FIGS. 15-17 below when there is the resource overlap.

Figure 15:
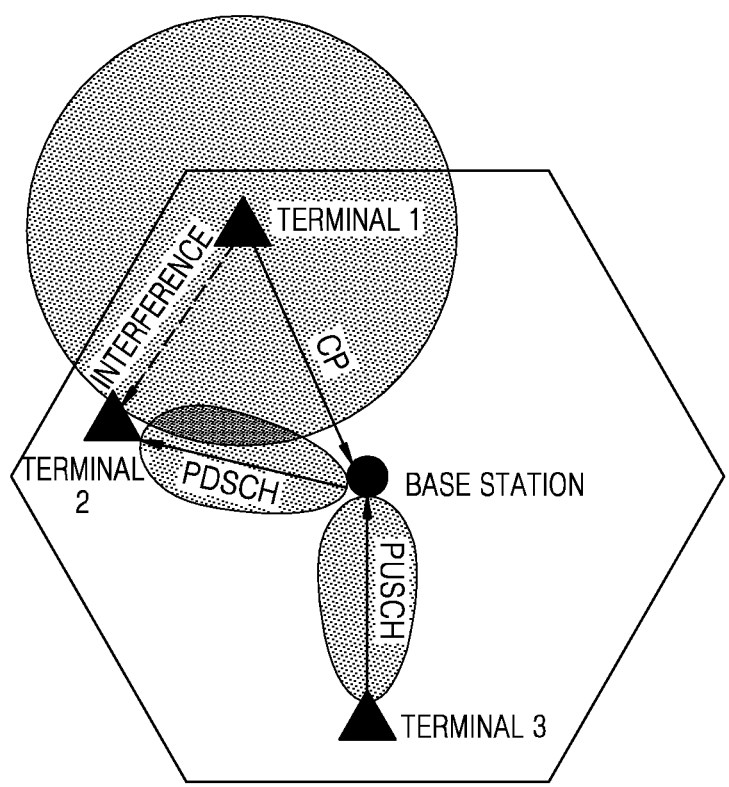
FIGS. 15-17 illustrate diagrams of an interference caused by resource overlap according to an embodiment of the present disclosure.

In FIG. 15, a terminal 1 is a terminal to be accessed, a terminal 2 is a terminal of receiving a downlink data from the base station, and a terminal 3 is a terminal of transmitting an uplink data to the base station.

Figure 16:
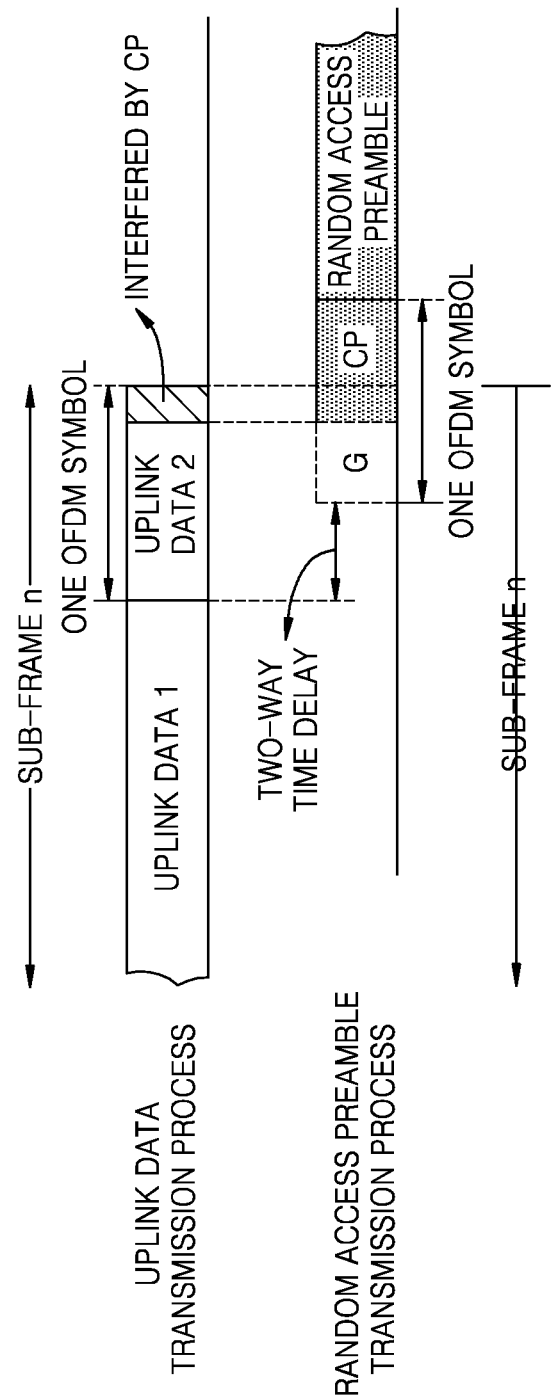

With reference to FIGS. 15 and 16, when the scheduling of the base station is received, the resource scheduled to terminals (for example, the terminal 2 and the terminal 3) that have been accessed is in the transmission time interval prior to the PRACH resource (the resource of transmitting the random access preamble) for the random access, and overlaps with the PRACH resource in a frequency domain, it is necessary to perform a corresponding processing.

As shown in FIG. 16, in performing the uplink data transmission, an uplink data 1 and an uplink data 2 are transmitted through a sub-frame n, and the uplink data 2 occupies one OFDM symbol. In a transmission process of the random access preamble, a portion of the CP of the random access preamble is also transmitted through the sub-frame n, and even a portion of the pre guard period G and the CP of the random access preamble is transmitted through the sub-frame n, wherein the pre guard period G and the CP occupy one OFDM symbol. In this case, there is an overlap with respect to time between a rear portion of the uplink data 2 and the cyclic prefix of the random access preamble, so that the uplink data is interfered by the CP.

Particularly, when the base station starts to transmit the last OFDM symbol of the sub-frame n at a time t, due to a two-way time delay, and from a view of the terminal, the base station starts to transmit the last OFDM symbol of the sub-frame n at time t+ δt, wherein δt is a one-way time delay. At this time, the terminal will do not know how much time should be advanced to perform a signal transmission due to not performing uplink synchronization. In this case, time t+ δt is selected to start to transmit the random access preamble, and the transmitted random access preamble can arrive at the base station through the one-way time delay with a length of δt, so from the view of the base station, the terminal starts to transmit the random access preamble at time t+2 δt, and in this case, as shown in FIG. 16, the two-way time delay is 2 δt. When the length of the two-way time delay cannot make the transmission of the uplink data 2 be prevented from being interfered, it is necessary to perform a corresponding processing, for example, the processing shown in FIG. 18.

Figure 17:
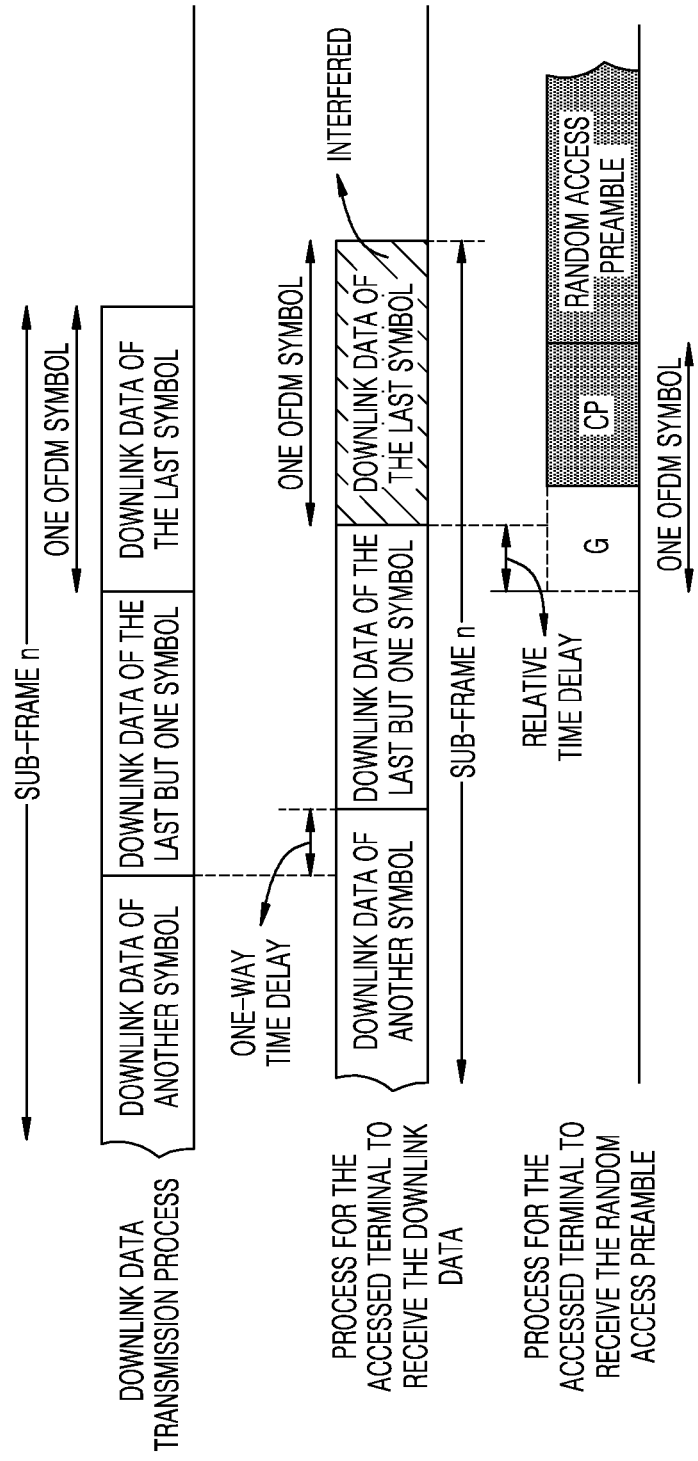

As shown in FIG. 17, in a procedure of performing the data transmission or random access preamble transmission through the sub-frame n, there may be the interference. For example, the base station can perform the downlink data transmission, and in the process of the downlink data transmission, the last OFDM symbol, the last but one OFDM symbol, and other symbols prior to the last but one OFDM symbol may be used. In the process that the accessed terminal receives the downlink data, the last OFDM symbol, the last but one OFDM symbol, and other symbols prior to the last but one OFDM symbol may be used. The accessed terminal not only receives the downlink data from the base station, but also can passively receive the random access preamble from another terminal, so that the same accessed terminal has the process of receiving the downlink data and the process of receiving the random access preamble. In the process that the accessed terminal receives the random access preamble, according to magnitudes of a relative time delay and the one-way time delay, the transmission of the random access preamble may perform interference on the accessed terminal which uses the last OFDM symbol to transmit the downlink data or using the last OFDM symbol and the last but one OFDM symbol to transmit the downlink data.

With reference to FIGS. 15 and 17, the base station transmits the downlink data on the last OFDM symbol of the sub-frame n at the time t, and the last OFDM symbol arrives at the terminal 2 through the time $δt_1$, that is, the terminal 2 starts to receive the downlink data from the time t+ $δt_1$. The terminal 1 transmits the random access preamble at the time t+ δt, and the random access preamble may arrive at the terminal 2 through time $δt_2$, and thus, the terminal 2 starts to passively receive the random access preamble of the terminal 1 at the time t+ $δt_2$.

The relative time delay is $δt_2-δt_1$, and when $δt_2<δt_1$, that is, a distance between the terminal 1 and the terminal 2 is closer than a distance between the base station and the terminal 2, the cyclic prefix of the random access preamble arrives at the terminal 2 earlier than the arrival of the downlink data carried by the last OFDM symbol, and in this case, the transmission of the downlink data of the last but one OFDM symbol may be interfered.

That is to say, a distance between the terminal to be accessed and the accessed terminal is unknown, and thus as for the accessed terminal that receives the downlink data within the transmission time interval prior to the period of transmitting the random access preamble, although the base station may configure that the accessed terminal does not receive data on the last symbol, the downlink data of the last but one OFDM symbol of the accessed terminal may also be interfered by the cyclic prefix of the passively received random access preamble. For example, when a distance between the terminal 2 of receiving the downlink data and the base station is larger than a distance between the terminal and the terminal 1 to be accessed in FIG. 15, and the terminal 2 is located within the coverage of the terminal 1, not only the downlink data of the last OFDM symbol with respect to the terminal 2 will be interfered by the cyclic prefix of the random access preamble transmitted by the terminal 1, but also the downlink data of the last but one OFDM symbol will be interfered by the cyclic prefix of the random access preamble, namely, the case shown in FIG. 17.

In the embodiment of the present disclosure, when there is provided a pre guard period before the cyclic prefix, the interference of the cyclic prefix of the random access preamble on the downlink data of the last but one OFDM symbol may be prevented.

In order to solve the problem of the interference caused by the resource overlap, for example, the interference of the cyclic prefix of the random access preamble on the downlink data of the last OFDM symbol, the accessed terminal may also indicate whether to transmit or receive data on the resource overlapped with the cyclic prefix of the random access preamble according to overlap resource transceiving data indication information provided by the base station. When the base station indicates that it is impossible to transmit or receive the data on the overlapped resource, the terminal avoids the overlapped resource when transmitting or receiving the data; and on the contrary, when the base station indicates that data may be transmitted or received on the overlapped resource, the terminal does not need to avoid the overlapped resource when transmitting or receiving the data. Here, the overlapped resource may indicate the overlapped resource both in the time domain and the frequency domain.

Figure 18:
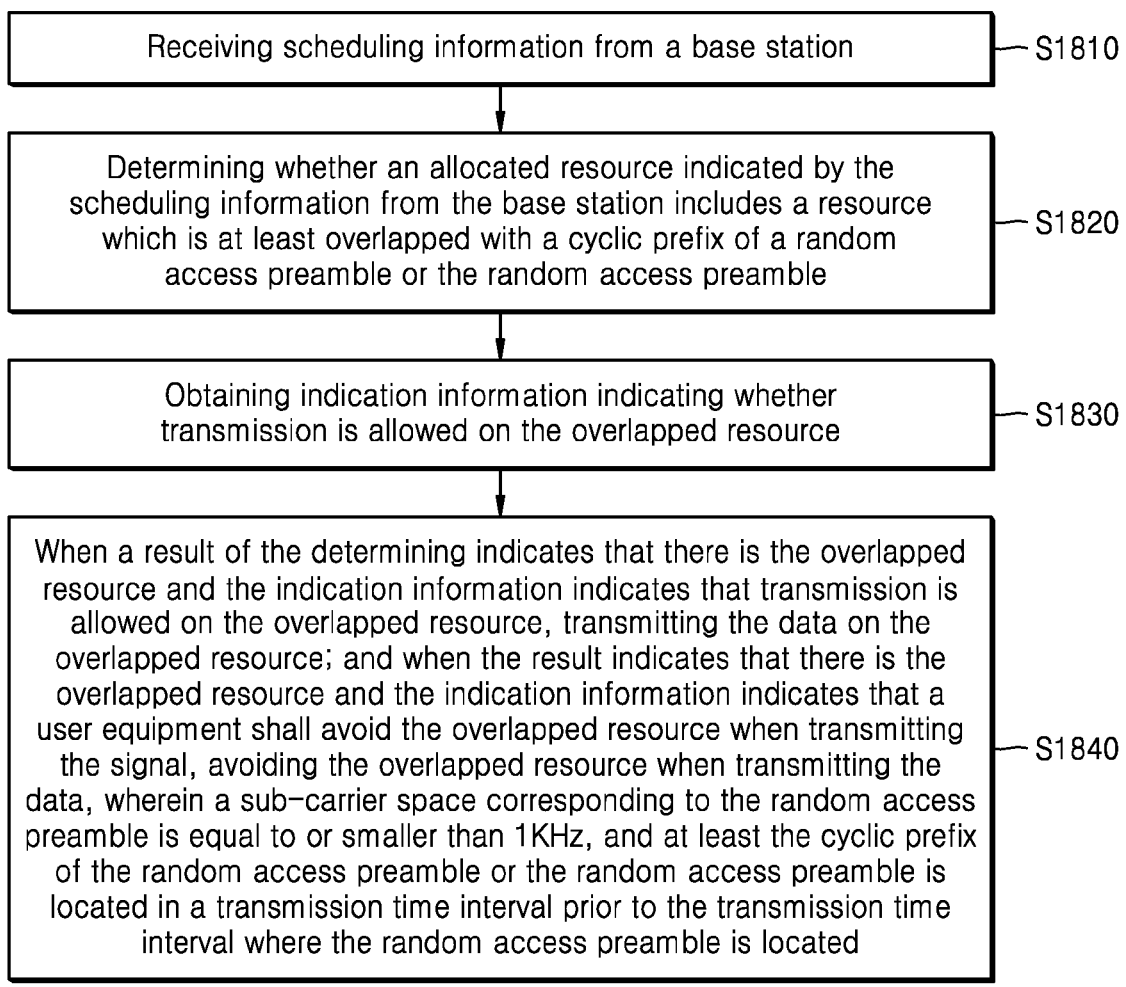
FIG. 18 illustrates a flow diagram of a data transmission method according to an embodiment of the present disclosure.

With reference to the flow diagram of a data transmission method according to an embodiment of the present disclosure shown in FIG. 18, the terminal can perform the followings: at step S1810, receiving scheduling information from a base station; at step S1820, determining whether an allocated resource indicated by the scheduling information from the base station includes a resource which is at least overlapped with a cyclic prefix of a random access preamble or the random access preamble (for example, the resource overlapped with the cyclic prefix, the resource overlapped with the cyclic prefix and the random access preamble and the like); at step S1830, obtaining indication information indicating whether transmission is allowed on the overlapped resource; and at step S1840, when a result of the determining indicates that there is the overlapped resource and the indication information indicates that transmission is allowed on the overlapped resource, transmitting the data on the overlapped resource; and when the result indicates that there is the overlapped resource and the indication information indicates that a user equipment shall avoid the overlapped resource when transmitting the signal, avoiding the overlapped resource when transmitting the data, wherein a sub-carrier space corresponding to the random access preamble is equal to or smaller than 1 KHz, and at least the cyclic prefix of the random access preamble or the random access preamble is located in a transmission time interval prior to the transmission time interval where the random access preamble is located. In addition, the resource which is scheduled to the terminal by the base station and which is received by the terminal may be not in the transmission time interval (the previous transmission time interval) prior to the random access preamble, or even the resource is in the previous transmission time interval, the frequency domain resource may also be different from the frequency domain resource occupied by the cyclic prefix of the random access preamble, and there is no overlapped resource in above two cases. When there is no overlapped resource, the indication information is invalid indication information, and at this time, data transmission may not be performed according to the indication information.

The indication information may be transmitted or notified through various manners, and for example, the indication information may be transmitted by using one bit in the downlink control information corresponding to a current scheduling, and can be notified to the terminal in the cell through a system information broadcasting manner, and can also be notified to the terminal when the terminal performs a radio resource control (RRC) connection.

According to the embodiment of the present disclosure, when a radius of the cell is relatively small (for example, the radius is smaller than or equal to 500 m (the radius of the small cell)), a solution that the adjacent cells share a logical root sequence number can be adopted, to at least partially eliminate the interference between the adjacent cells caused by the random access preamble.

Figure 19:
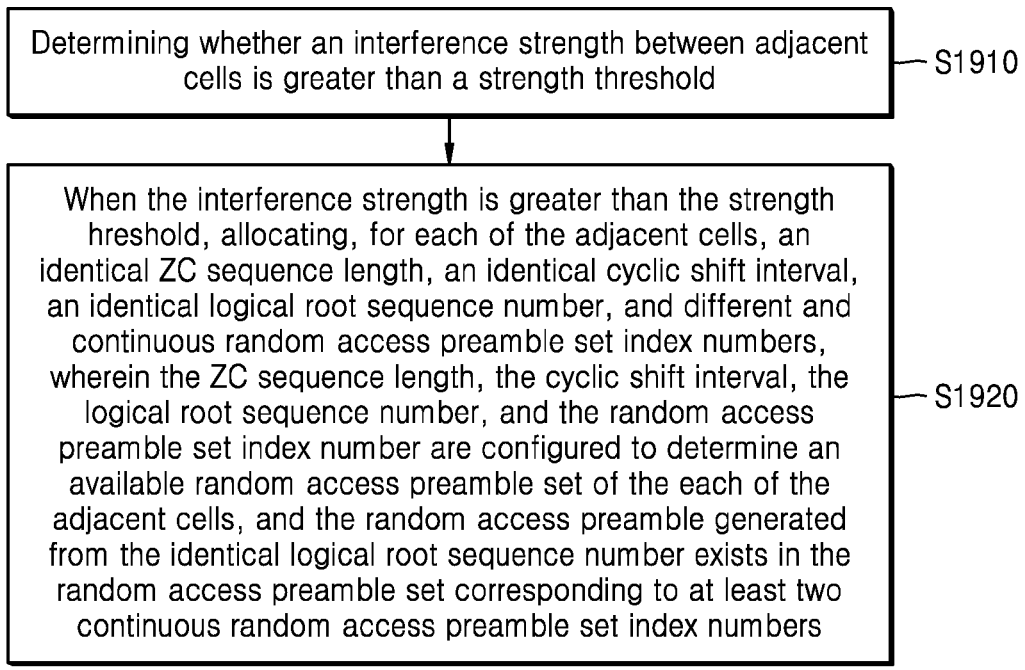
FIG. 19 illustrates a flow diagram of a random access preamble allocation method according to an embodiment of the present disclosure.

FIG. 19 illustrates a flow diagram of a random access preamble allocation method according to an embodiment of the present disclosure, to reduce an inter-cell interference, and the method can be performed through a network layer for parameter allocation.

As shown in FIG. 19, the random access preamble allocation method according to the embodiment of the present disclosure includes:

S1910, determining whether an interference strength between adjacent cells is greater than a strength threshold;

S1920, when the interference strength is greater than the strength threshold, allocating, for each of the adjacent cells, an identical ZC sequence length, an identical cyclic shift interval, an identical logical root sequence number, and different and continuous random access preamble set index numbers (that is, the random access preamble set index numbers of the adjacent cells are different and continuous) for each of the adjacent cells, wherein the ZC sequence length, the cyclic shift interval, the logical root sequence number, and the random access preamble set index number are configured to determine an available random access preamble set of the each of the adjacent cells, and the random access preamble generated from the identical logical root sequence number exists in the random access preamble set corresponding to at least two continuous random access preamble set index numbers. Here, in the respective random access leading sequences generated from the identical logical root sequence number, any two random access preambles are orthogonal.

In addition, when the interference strength is lower than the strength threshold, allocation is performed for any two cells according to one of the following manners: the logical root sequence numbers are mutually different and the random access preamble set index numbers are the same, the logical root sequence numbers are the same and the random access preamble set index numbers are mutually different, and the logical root sequence numbers are mutually different and the random access preamble set index numbers are mutually different. As for the ZC sequence lengths and the cyclic shift intervals, when the logical root sequence numbers are the same (that is, the random access preamble set index numbers are mutually different), the ZC sequence lengths are the same and the cyclic shift intervals are also the same; and when the logical root sequence numbers are mutually different (that is, the random access preamble set index numbers may be the same, and may also be mutually different), the ZC sequence lengths of the two cells may be the same and the cyclic shift intervals may also be the same.

As an example, the cyclic shift index sequence may be generated according to the following steps, wherein the cyclic shift index sequence does not need to be practically generated, that is, the cyclic shift index sequence is only a virtual sequence:

according to the ZC sequence length and the cyclic shift interval, calculating a number of the random access preambles that can be generated from one logical root sequence number, wherein the calculated number of the random access preambles is larger than a number of the available random access preambles of the cell; according to the logical root sequence number, generating cyclic shift indexes of which the number is the calculated number of the random access preambles; enabling the logical root sequence number to be increased by 1, and according to the logical root sequence number increased by 1, generating cyclic shift indexes of which the number is the calculated number of the random access preambles, wherein the present step (the step of enabling the logical root sequence number to be increased by 1, and according to the logical root sequence number increased by 1, generating the cyclic shift indexes) is at least performed once; and arranging the generated cyclic shift indexes according to a predetermined order, to generate a cyclic shift index sequence (for example, the cyclic shift indexes generated by performing the above step one of several times are arranged according an order from small to large, and the cyclic shift index generated by performing the above step in a former time is arranged before the cyclic shift index generated by performing the above step in a later time).

As an example, the allocating the random access preamble set index numbers includes: dividing the cyclic shift index sequences into a plurality of sets according to the number of the available random access preambles, each set corresponding to an unique random access preamble set index number; and allocating different random access preamble set index numbers for each of the at least two adjacent cells.

As for the small cell with a radius of 500 m or the similar cell, the cyclic shift interval NCS of the random access preamble only needs to be larger than and equal to 9. In this case, the number of the random access preambles that can be generated by one physical root sequence number may be 116. In the present embodiment, the number of the available random access preambles of each cell may be configured to be 64.

Different from the LTE system and the NR system, the adjacent cells may share the identical cyclic shift interval NCS and the identical logical root sequence number (since the logical root sequence number corresponds to the physical root sequence number, the adjacent cells also share the identical physical root sequence number), one unique random access preamble set index number may be allocated for each cell.

Figure 20:
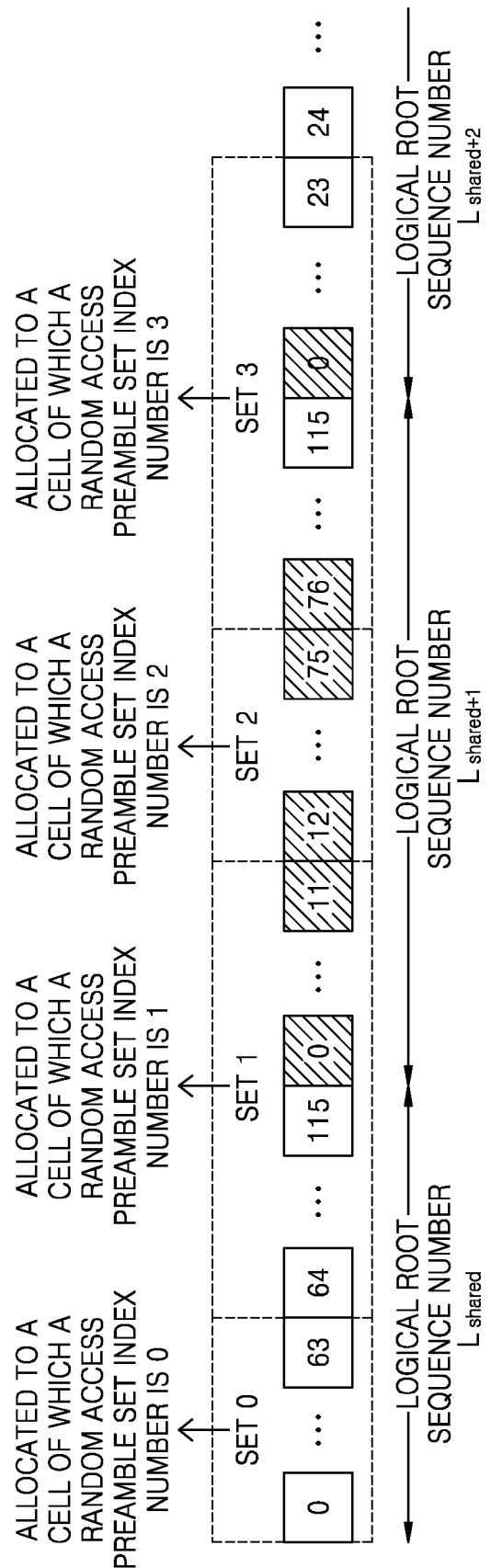
FIG. 20 illustrates a diagram of allocating a random access preamble set index number according to an embodiment of the present disclosure.

Particularly, the cyclic shift interval of the random access preambles may be configured to be NCS=9, and in conjunction with FIG. 20, the random access preamble allocation method according to the embodiment of the present disclosure is described.

With reference to FIG. 20, the adjacent at least two cells share the cyclic shift interval NCS=9, and also share the identical logical root sequence number. The number N of the random access preambles that can be generated by one logical root sequence number can be calculated through $[N_{ZC}/N_{CS}]$, wherein NZC indicates the ZC sequence length, $\lfloor \cdot \rfloor$ indicates a round-down operation. For example, the number (N=116) of the random access preambles that can be generated by one logical root sequence number is obtained through calculation at the given ZC sequence length.

In the case where the ZC sequence length, the logical root sequence number, and the cyclic shift interval are determined, a cyclic shift index vector $\vec{V}_L = [v_L^0 \ldots v_L^{N-1}]$ can be defined, the vector is explained only for convenient description, and in fact, the vector may not be generated, wherein $v_L^0$ indicates the cyclic shift index with respect to a value of the logical root sequence number L being 0, and the corresponding cyclic shift amount is $v_L^0 \cdot N_{CS}$; and $v_L^1$ indicates the cyclic shift index with respect to a value of the logical root sequence number L being 1, and the corresponding cyclic shift amount is $v_L^1 \cdot N_{CS}$ and so forth. When the random access preamble transmitted by the terminal is generated according to the logical root sequence number L and the cyclic shift amount is $v_L^n \cdot N_{CS}$, the terminal selects the cyclic shift index $v_L^n$, $0 \leq n < N$.

The logical root sequence number shared by the cells can be indicated as Lshared, and respective elements (that is, $v_{L_{shared}}^0$ to $v_{L_{shared}}^{N-1}$) in a cyclic shift index vector generated according to the logical root sequence number Lshared can be arranged from small to large according to the value of the logical root sequence number. Subsequently, the logical root sequence number is increased by 1, to generate corresponding cyclic shift indexes and arrange the same (for example, in the arrangement manner described in the embodiment of the present disclosure), such an operation is at least performed one time. Subsequently, the cyclic shift index sequence shown in FIG. 20 is formed.

Since the number of the available random access preambles of each cell is configured to be 64, the previous 64 cyclic shift index sequences may be defined as a set 0, to be allocated to the cell of which the random access preamble set index number is 0, that is, a user in the cell of which the random access preamble set index number is 0 selects his own random access preamble in the 64 cyclic shift indexes $\{v_{L_{shared}}^0, v_{L_{shared}}^1, \text{harv}_{L_{shared}}^{63}\}$; the 64 cyclic shift indexes after the set 0 is defined as a set 1, to be allocated to the cell of which the random access preamble set index number is 1, that is, the user in the cell of which the random access preamble set index number is 1 selects his own random access preamble in the 64 cyclic shift indexes $\{v_{L_{shared}}^{64}, \ldots, v_{L_{shared}}^{115}, v_{L_{shared}+1}^0, \ldots, v_{L_{shared}+1}^{11}\}$; the 64 cyclic shift indexes after the set 1 is defined as a set 2, to be allocated to the cell of which the random access preamble set index number is 2, that is, the user in the cell of which the random access preamble set index number is 2 selects his own random access preamble in the 64 cyclic shift indexes $\{v_{L_{shared}+1}^{12}, \ldots, v_{L_{shared}+1}^{75}\}$; and so forth.

Accordingly, according to the random access preamble allocation method of the embodiment of the present disclosure, from among the random access preambles of each cell and the random access preamble of at least one cell adjacent to the each cell, there at least exist a part of random access preambles that are generated from the identical logical root sequence number, so that the part of random access preambles of the each cell and the part of random access preambles of the at least one cell are mutually orthogonal. An interference degree between the orthogonal random access preambles is lower than an interference degree between the non-orthogonal random access preambles, so that the mutual interference between the random access preambles between the adjacent cells can be reduced.

In the embodiment of the present disclosure, the number of the random access preambles is set to be 64, which is not to limit the protection scope of the present disclosure, and any predetermined number of random access preambles are all possible.

Figure 21:
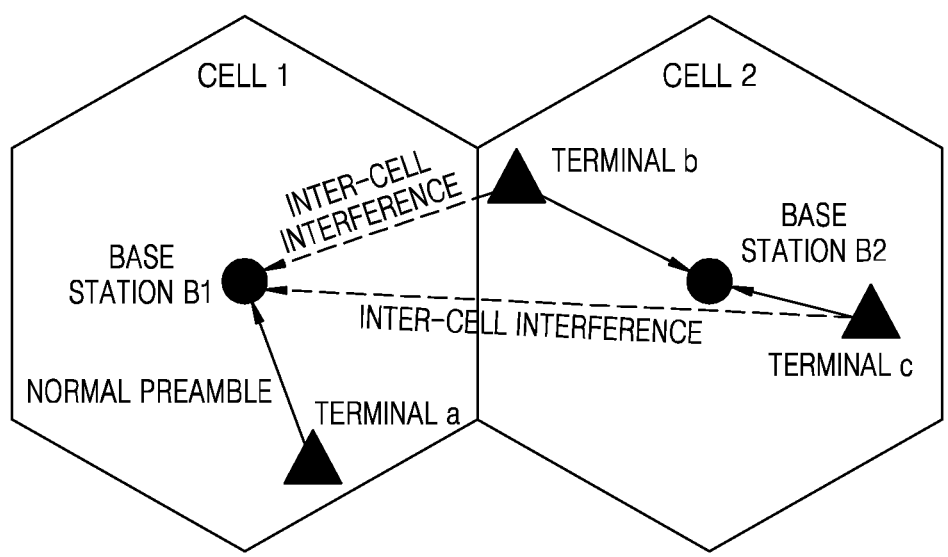
FIG. 21 illustrates a diagram of an interference situation of a random access preamble among cells according to an embodiment of the present disclosure.

FIG. 21 shows a diagram of an interference situation of a random access preamble among cells according to an embodiment of the present disclosure.

As shown in FIG. 21, a cell C1 of a base station B1 is adjacent to a cell C2 of a base station B2, a terminal a is in the cell C1, a terminal b and a terminal c are in the cell C2. According to the allocation solution of logical root sequence numbers of the existing LTE system or NR system, the cell C1 and the cell C2 are allocated with different logical root sequence numbers. In consideration of reducing a system expense, the terminal in the two cells can transmit the random access preamble on the identical PRACH resource.

In this case, according to a property of the ZC sequence, no matter what cyclic shift index is selected as the random access preamble with respect to the cells C1 and C2, it is impossible to exist a case where the random access preamble of the cell C1 and the random access preamble of the cell C2 are orthogonal, resulting in occurrence of the interference.

For example, when the base station B1 of the cell C1 performs a detection on the random access preamble, there may be energy from the random access preamble of the cell C2 (for example, the random access preamble from the terminal b or the terminal c) overlapped on a background interference or a ground noise of the cell C1. Since radii of the two cells are very small, the energy overlapped on the background interference or noise of the cell C1 may reach a degree of affecting the detection of the terminal a on the random access preamble. In addition, the terminal of which the random access fails in the cell C2 may improve an emission power of the terminal to attempt a re-access, which may also affect the detection on the random access preamble in the cell C1.

According to the embodiment of the present disclosure, assuming that the random access preamble set 0 as shown in FIG. 20 is allocated to the cell C1, the random access preamble set 1 is allocated to the cell C2, and assuming the terminal b selects $v_{L_{shared}}^{64}$ as the random access preamble, and the terminal c selects $v_{L_{shared}+1}^{0}$ as the random access preamble. In this case, since the random access preamble of the terminal b and the random access preamble of the terminal a are orthogonal, the effect on the detection for the random access preamble of the terminal a is reduced.

In the embodiment of the present disclosure, the characteristics involved in the random access preamble allocation method and the random access preamble determination method can be similar to those described with respect to the PRACH. For example, the sub-carrier space corresponding to the random access preamble can be lower than 1.25 KHz, which will not be repeated herein.

In this case, with reference to FIG. 21, since the length of the random access preamble is increased, the effect on the detection for the random access preamble of the terminal b is also reduced.

Figure 22:
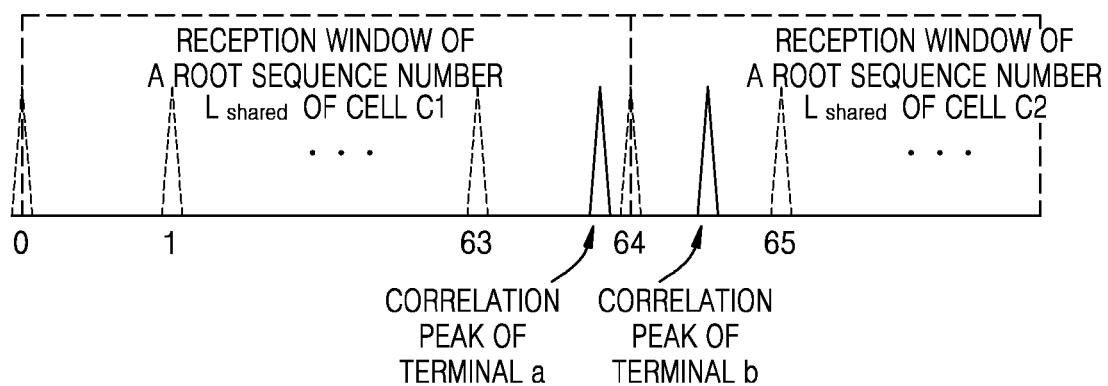
FIG. 22 illustrates a diagram of restraining an inter-cell interference according to an embodiment of the present disclosure.

FIG. 22 illustrates a diagram of restraining an inter-cell interference according to an embodiment of the present disclosure.

As shown in FIG. 22, when the base station B1 uses a root ZC sequence of which the logical root sequence number is Lshared to perform a detection, a correlation peak of the random access preamble of the terminal b will be outside of a reception window of a root sequence number Lshared of the cell C1, which may not affect the detection for the random access preamble of the terminal a. Thus, the inter-cell interference is at least partially eliminated.

In the present embodiment, when allocating the random access preambles through the above manner, the random access preambles can also be implemented according to the definition on the physical random access channel in the above embodiment. For example, the sub-carrier space corresponding to the random access preamble can be enabled to be lower than 1.25 KHz.

Corresponding to the random access preamble allocation method, according to the embodiment of the present disclosure, when the terminal performs an access operation, the available random access preamble can be determined according to the allocation solution of the random access preamble of the cell (a target cell) to which the terminal is to be accessed.

Figure 23:
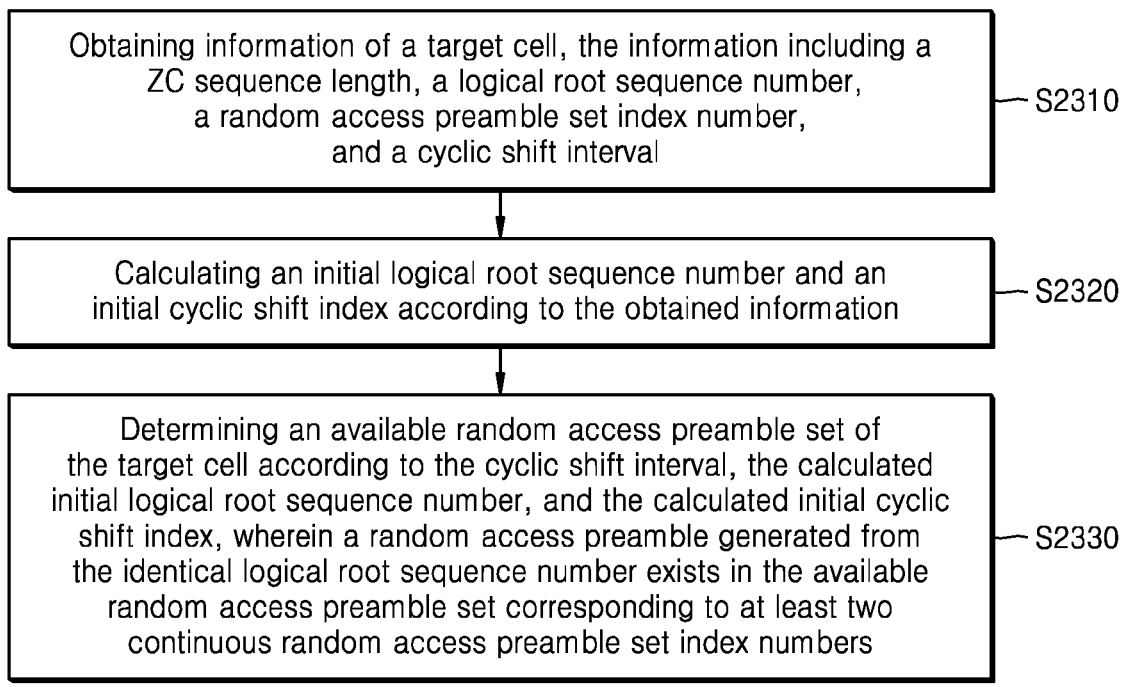
FIG. 23 illustrates a flow diagram of a random access preamble determination method according to an embodiment of the present disclosure.

FIG. 23 illustrates a flow diagram of a random access preamble determination method according to an embodiment of the present disclosure.

The random access preamble determination method according to the embodiment of the present disclosure includes: S2310, obtaining information of a target cell, the information including a ZC sequence length, a logical root sequence number, a random access preamble set index number, and a cyclic shift interval; S2320, calculating an initial logical root sequence number and an initial cyclic shift index according to the obtained information; S2330, determining an available random access preamble set of the target cell according to the cyclic shift interval, the calculated initial logical root sequence number, and the calculated initial cyclic shift index, wherein a random access preamble generated from the identical logical root sequence number exists in the available random access preamble set corresponding to at least two continuous random access preamble set index numbers.

As an example, the calculating the initial logical root sequence number and the initial cyclic shift index according to the obtained information includes: calculating, according to the ZC sequence length and the cyclic shift interval, a number of random access preambles generated from one logical root sequence number; calculating the initial logical root sequence number, according to the logical root sequence number, the random access preamble set index number, and the calculated number of the random access preambles; and calculating the initial cyclic shift index, according to the random access preamble set index number and the calculated number of the random access preambles.

As an example, the determining the available random access preamble set of the target cell includes: determining, according to a correspondence between the logical root sequence number and a physical root sequence number, an initial physical root sequence number corresponding to the initial logical root sequence number; and selecting and generating, according to the initial physical root sequence number, a random access preamble of which a cyclic shift amount is greater than or equal to a product of the initial cyclic shift index and the cyclic shift interval and of which the number is a predetermined number, wherein when the number of the random access preamble, of which the cyclic shift amount generated according to the initial physical root sequence number is greater than or equal to the product of the initial cyclic shift index and the cyclic shift interval, is smaller than the predetermined number, the logical root sequence number is increased by 1; in the random access preamble corresponding to the logical root sequence number after being increased by 1, the random access preamble is selected starting from the random access preamble of which a cyclic shift index is smallest, in an order of the cyclic shift index from small to large, to be expanded into the random access preamble that has been selected; and operations of increasing the logical root sequence number by 1 and selecting the random access preamble in the order are repeated, until the number of the selected random access preamble reaches the predetermined number.

For example, when a terminal in the target cell monitors a broadcast signal of the target cell, the terminal can know through the broadcast signal that with respect to the target call, the logical root sequence number is Lshared, the random access preamble set index number is $N_{ID}^{preambleSet}$, and the cyclic shift interval is NCS.

The terminal first can calculate that the number of the random access preambles that can be generated by one logical root sequence number is $N=\lfloor N_{ZC}/N_{CS} \rfloor$, and $\lfloor \bullet \rfloor$ indicates a round-down operation. Subsequently, the terminal can determine the initial logical root sequence number of the target cell to be:

$$L_{start} = L_{shared} + \left\lfloor \frac{64 \times N_{ID}^{preambleSet}}{N} \right\rfloor,$$

and the initial cyclic shift index to be: $v_{start}=(64 \times N_{ID}^{preambleSet})$mod N, wherein $\lfloor \cdot \rfloor$ indicates the round-down operation, and mod is a modulo operation.

In the embodiment of the present disclosure, the PRACH resource can be designed, configured and selected according to the design, configuration and selection method of the PRACH resource of the LTE system, the NR system or other communication systems. In the case where the terminal obtains the PRACH resource for transmitting the random access preamble, the available random access preamble of the terminal can be determined according to the above described method, subsequently, the random access preamble can be selected from the available random access preamble, to be transmitted.

All random access preambles can be generated by the zero relevant ZC sequence, and can be obtained from one or more root ZC sequences. Each cell will broadcast the ZC sequence length $N_{ZC}$, the logical root sequence number $L_{shared}$, the random access preamble set index number $N_{ID}^{preambleSet}$, and the cyclic shift interval $N_{CS}$ used by the each cell.

In this case, the terminal can calculate the initial logical root sequence number $L_{start}$ and the initial cyclic shift index $v_{start}$ of the cell according to the method in the above embodiment. The terminal can map the initial physical root sequence number $u_{start}$, which corresponds to the logical root sequence number $L_{start}$ one by one, according to Table 5.7.2-4 in the protocol LTE 36.211. According to the values of the cyclic shift interval $N_{CS}$ and the initial cyclic shift index $v_{start}$, all cyclic shift sequences, of which the cyclic shift amount is greater than or equal to $N_{cs} \times v_{start}$ and which correspond to the initial physical root sequence number $u_{start}$ may be generated.

When the number of all available cyclic shift sequences of the initial physical root sequence number $u_{start}$ does not reach 64, the logical root sequence number may be increased by 1, and in all random access preambles corresponding to the logical root sequence number $L_{start}+1$, random access preambles corresponding to the smallest index are sequentially selected as extension of selectable random access preambles of the present cell, and when the last cyclic shift of the logical root sequence number $L_{start}+1$ cannot make the number of the available random access preambles of the present cell reach 64, the logical root sequence number is increased by 1 again, to continuously extend the available random access preambles of the present cell. And so forth, it is not stopped until the terminal can obtain all 64 available random access preambles of the present cell.

In addition, the logical root sequence number of the ZC sequences is cyclic, that is, in the mapping table of the logical root sequence number and the physical root sequence number, the logical root sequence number obtained by increasing the last logical root sequence number by 1 is the first logical root sequence number in the mapping table.

The 64 random access preambles are arranged according to an order of first making the cyclic shift indexes be increased gradually and then making the logical root sequence numbers be increased gradually.

Figure 24:
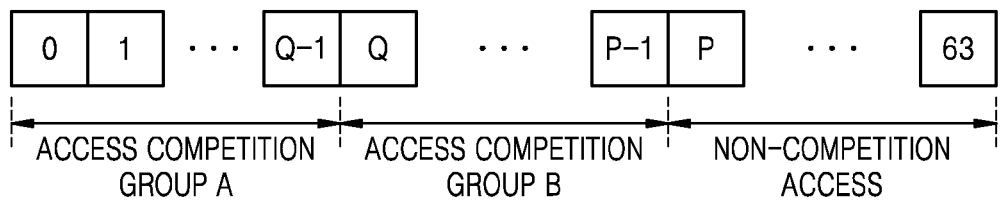
FIG. 24 illustrates a diagram of grouping random access preambles according to an embodiment of the present disclosure.

FIG. 24 illustrates a diagram of grouping random access preambles according to an embodiment of the present disclosure.

The 64 random access preambles are divided into three groups, as shown in FIG. 24. The first number P of 64 random access preambles are used for competition-based random access, the rest number (64-P) of random access preambles are used for non-competition-based random access, wherein the first number Q of random access preambles used for competition-based random access are called as group A, the later numbers (P-Q) are called as group B, and the purpose of such a grouping is to increase prior information of the subsequent transmitted message 3 (Msg3) of the terminal in the random access procedure. The terminal obtains values of P and Q from the system information broadcast by the cell. Similar to the existing access method, if what is performed by the terminal is a non-competition-based random access, the terminal directly obtains a specific random access preamble from a high-layer signaling issued by the base station to the terminal itself. If what is performed by the terminal is a competition-based random access, the terminal first needs to determine whether to select the random access preamble from A group or to select the random access preamble from B group, and the manner of determining the random access preamble group is the same as the existing method, which will not be repeated herein. After the random access preamble group is determined, the terminal selects the random access preamble in the determined group equiprobably and randomly. No matter it is allocation of the base station allocates or random selection of the terminal, the terminal obtains the physical root sequence number and the cyclic shift index of the random access preamble to be transmitted by the terminal itself, and the physical root sequence number and the cyclic shift index are marked as u and v, respectively. $x_u(n)$ root ZC sequence is defined as:

$$x_u(n) = \exp\left\{-j\frac{un(n+1)}{N_{ZC}}\right\}, 0 \le n \le N_{ZC}-1.$$

Through the root ZC sequence $x_u(n)$, the terminal can obtain a practically transmitted digital baseband random access preamble $x_{u,v}(n)=x_u((n+vN_{CS})\bmod N_{ZC})$. Experiencing IDFT and resource mapping according to the frame structure provided in Embodiment 1, a baseband random access preamble signal can be obtained. Similar to the LTE/NR system, in the procedure of performing an up-conversion, in order to ensure the pre guard band and post guard band of random access preamble are same, it is necessary to perform frequency shift of several sub-carrier waves to a high frequency direction, and as for the random access preamble structure provided in the present application, a frequency shift amount is $\varphi \cdot \Delta f_{preamble}$, wherein $\varphi=8$.

Figure 25:
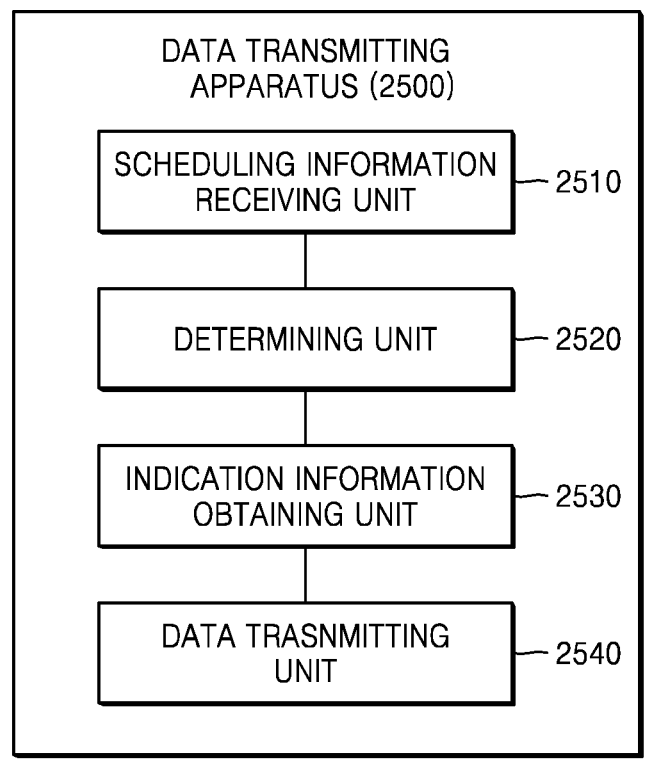
FIG. 25 illustrates a block diagram of a data transmission apparatus according to an embodiment of the present disclosure.

FIG. 25 illustrates a block diagram of a data transmission apparatus 2500 according to an embodiment of the present disclosure.

As shown in FIG. 25, the data transmission apparatus 2500 may include: a scheduling information receiving unit 2510, which receives scheduling information from a base station; a determining unit 2520, which determines whether an allocated resource indicated by the scheduling information from the base station includes a resource which is at least overlapped with a cyclic prefix of a random access preamble or the random access preamble; an indication information obtaining unit 2530, which obtains indication information indicating whether transmission is allowed on the overlapped resource; a data transmitting unit 2540, which transmits a signal on the overlapped resource, when a result of the determination indicates that there is the overlapped resource and the indication information indicates that the transmission is allowed on the overlapped resource, and avoids the overlapped resource when transmitting the signal, when the result indicates that there is the overlapped resource and the indication information indicates that a user equipment shall avoid the overlapped resource when transmitting the signal, wherein a sub-carrier space corresponding to the random access preamble is equal to or smaller than 1 KHz, and the cyclic prefix of the random access preamble or the random access preamble is located in a transmission time interval prior to the transmission time interval where the random access preamble is located.

The the data transmission apparatus 2500 may correspond to the terminal device.

Figure 26:
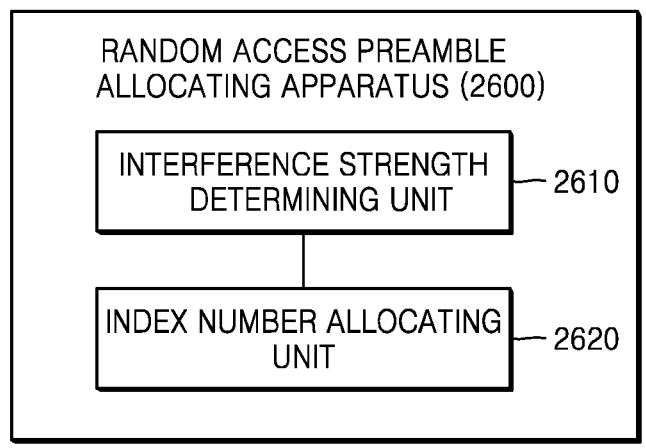
FIG. 26 illustrates a block diagram of a random access preamble allocation apparatus according to an embodiment of the present disclosure.

FIG. 26 illustrates a block diagram of a random access preamble allocation apparatus 2600 according to an embodiment of the present disclosure.

As shown in FIG. 26, the random access preamble allocation apparatus 2600 may include: an interference strength determining unit 2610, which determines whether an interference strength between adjacent cells is greater than a strength threshold; and an index number allocating unit 2620, which allocates, for each of the adjacent cells, an identical ZC sequence length, an identical cyclic shift interval, an identical logical root sequence number, and different and continuous random access preamble set index numbers, when the interference strength is greater than the strength threshold, wherein the ZC sequence length, the cyclic shift interval, the logical root sequence number, and the random access preamble set index number are configured to determine an available random access preamble set of the each of the adjacent cells, and wherein the random access preamble generated from the identical logical root sequence number exists in the available random access preamble set corresponding to at least two continuous random access preamble set index numbers.

As an example, a sub-carrier space corresponding to the random access preamble is lower than 1.25 KHz.

As an example, the sub-carrier space is equal to 1 KHz, and a pre guard period of the random access preamble and a cyclic prefix of the random access preamble are located in a transmission time interval prior to the transmission time interval where the random access preamble is located.

As an example, the sub-carrier space is higher than 1 KHz and lower than 1.25 KHz, and a sum of lengths of following items is 1 ms: a pre guard period of the random access preamble, a cyclic prefix of the random access preamble, the random access preamble, and a post guard period of the random access preamble.

As an example, the post guard period is zero, and a cyclic prefix of a first OFDM symbol in a transmission time interval subsequent to the transmission time interval, where the random access preamble is located, functions as the post guard period of the random access preamble, or, the length of the pre guard period is equal to the length of the cyclic prefix of the random access preamble, and a difference between a sum of lengths, which include the length of the post guard period and a length of the cyclic prefix of the first OFDM symbol of the subsequent transmission time interval, and the length of the cyclic prefix of the random access preamble is smaller than or equal to 2 Ts, or, the length of the pre guard period is zero, and a difference between the length of the post guard period and the length of the cyclic prefix of the random access preamble is smaller than or equal to 2 Ts.

The random access preamble allocation apparatus 2600 may correspond to the terminal device, the base station, network entity or other device.

Figure 27:
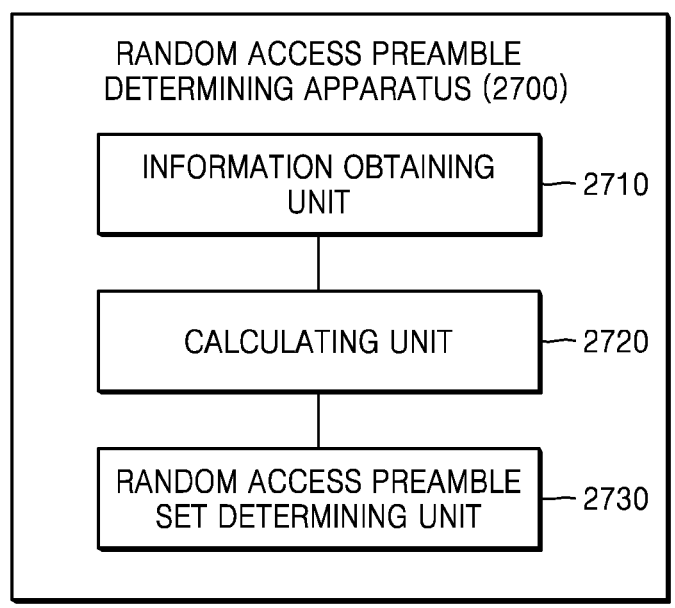
FIG. 27 illustrates a block diagram of an apparatus for determining a random access preamble according to an embodiment of the present disclosure.

FIG. 27 illustrates a block diagram of a random access preamble determination apparatus 2700 according to an embodiment of the present disclosure.

As shown in FIG. 27, the random access preamble determination apparatus 2700 may include: an information obtaining unit 2710, which obtains information of a target cell, the information including a ZC sequence length, a logical root sequence number, a random access preamble set index number, and a the cyclic shift interval; a calculating unit 2720, which calculates an initial logical root sequence number and an initial cyclic shift index according to the obtained information; and a random access preamble set determining unit 2730, which determines an available random access preamble set of the target cell according to the cyclic shift interval, the calculated initial logical root sequence number, and the calculated initial cyclic shift index.

As an example, the calculating unit 2720 is configured to: calculate, according to the ZC sequence length and the cyclic shift interval, a number of random access preambles generated from one logical root sequence number; calculate the initial logical root sequence number, according to the logical root sequence number, the random access preamble set index number, and the calculated number of the random access preambles; and calculate the initial cyclic shift index, according to the random access preamble set index number and the calculated number of the random access preambles.

As an example, the random access preamble set determining unit 2730 is configured to: determine, according to a correspondence between the logical root sequence number and a physical root sequence number, an initial physical root sequence number corresponding to the initial logical root sequence number; and select and generate, according to the initial physical root sequence number, a random access preamble of which a cyclic shift amount is greater than or equal to a product of the initial cyclic shift index and the cyclic shift interval and of which the number is a predetermined number, wherein when the number of the random access preamble, of which the cyclic shift amount generated according to the initial physical root sequence number is greater than or equal to the product of the initial cyclic shift index and the cyclic shift interval, is smaller than the predetermined number, the logical root sequence number is increased by 1; in the random access preamble corresponding to the logical root sequence number after being increased by 1, the random access preamble is selected starting from the random access preamble of which a cyclic shift index is smallest, in an order of the cyclic shift index from small to large, to be expanded into the random access preamble that has been selected; and operations of increasing the logical root sequence number by 1 and selecting the random access preamble in the order are repeated, until the number of the selected random access preamble reaches the predetermined number.

The random access preamble determination apparatus 2700 may correspond to the terminal device, the base station, network entity or other device.

The embodiment of the present disclosure designs a time domain structure of the PRACH resource with respect to a full-duplex cell. Through a manner of increasing the length of the random access preamble, a detection ability of the random access preamble is improved, and the random access preambles are allocated by sharing the logical root sequence number, to improve the number of the orthogonal random access preambles. On one hand, the mutual interference between the random access preambles of different terminals in the present cell can be reduced, and on the other hand, the ability against the interference of the downlink signals of the present cell and the adjacent cell on the random access preamble is also improved, so that the mutual interference on the random access preambles between the adjacent cells is reduced or even totally eliminated.

According to another embodiment of the present disclosure, there is provided a computer readable storage medium stored with a computer program, wherein when the computer program is performed by a processor, the above described method is implemented.

According to another embodiment of the present disclosure, there is provided an electronic apparatus, wherein the electronic apparatus includes: a processor; and a storage stored therein a computer program, wherein when the computer program is performed by a processor, the above described method is implemented.

The program running on the device according to the present disclosure may be a program that causes a computer to implement the functions of the embodiments of the present disclosure by controlling a central processing unit (CPU). The program or information processed by the program may be temporarily stored in volatile memory (such as random access memory RAM), hard disk drive (HDD), non-volatile memory (such as flash memory), or other memory systems.

Computer-executable instructions or programs for implementing the functions of various embodiments of the present disclosure may be recorded on a computer-readable storage medium. Corresponding functions can be realized by having a computer system read programs recorded on the recording medium and execute these programs. The so-called "computer system" herein may be a computer system embedded in the device, and may include an operating system or hardware (such as a peripheral device). The "computer-readable storage medium" may be a semiconductor recording medium, an optical recording medium, a magnetic recording medium, a short-time dynamic storage program recording medium, or any other recording media readable by a computer.

Various features or functional modules of the devices used in the above embodiments may be implemented or performed by circuitry (e.g., a single-chip or multi-chip integrated circuit). Circuits designed to perform the functions described in the present specification may include general purpose processors, digital signal processors (DSPs), application specific integrated circuits (ASICs), field programmable gate arrays (FPGAs), or other programmable logic devices, discrete Gate or transistor logic, discrete hardware components, or any combination of the above. A general-purpose processor may be a microprocessor or any existing processor, controller, microcontroller, or state machine. The above circuit may be a digital circuit or an analog circuit. In a case of new integrated circuit technology that replaces existing integrated circuits due to advances in semiconductor technology, one or more embodiments of the present disclosure may also be implemented using these new integrated circuit technologies.

Figure 28:
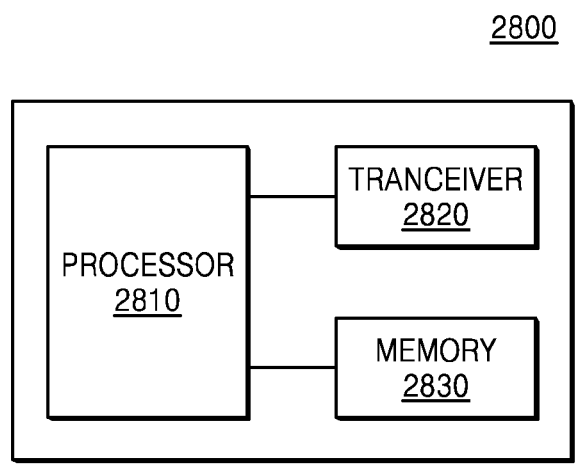
FIG. 28 illustrates a terminal device according to embodiments of the present disclosure.

FIG. 28 illustrates a terminal device according to embodiments of the present disclosure.

Referring to the FIG. 28, the terminal device 2800 may include a processor 2810, a transceiver 2820 and a memory 2830. However, all of the illustrated components are not essential. The terminal device 2800 may be implemented by more or less components than those illustrated in FIG. 28. In addition, the processor 2810 and the transceiver 2820 and the memory 2830 may be implemented as a single chip according to another embodiment.

The terminal device 2800 may correspond to the terminal device 1100 of FIG. 11. Also, the processor 2810 may correspond to the processor 1101 and the memory 2830 may correspond to the memory 1102.

The terminal device 2800 may correspond to the data transmitting apparatus 2500. The terminal device 2800 may correspond to the random access preamble allocation apparatus 2600. The terminal device 2800 may correspond to the random access preamble determining apparatus 2700.

The aforementioned components will now be described in detail.

The processor 2810 may include one or more processors or other processing devices that control the proposed function, process, and/or method. Operation of the UE 2800 may be implemented by the processor 2810.

The transceiver 2820 may include a RF transmitter for up-converting and amplifying a transmitted signal, and a RF receiver for down-converting a frequency of a received signal. However, according to another embodiment, the transceiver 2820 may be implemented by more or less components than those illustrated in components.

The transceiver 2820 may be connected to the processor 2810 and transmit and/or receive a signal. The signal may include control information and data. In addition, the transceiver 2820 may receive the signal through a wireless channel and output the signal to the processor 2810. The transceiver 2820 may transmit a signal output from the processor 2810 through the wireless channel.

The memory 2830 may store the control information or the data included in a signal obtained by the UE 2800. The memory 2830 may be connected to the processor 2810 and store at least one instruction or a protocol or a parameter for the proposed function, process, and/or method. The memory 2830 may include read-only memory (ROM) and/or random access memory (RAM) and/or hard disk and/or CD-ROM and/or DVD and/or other storage devices.

In an embodiment, the processor 2810 configured to receive time-frequency resource configuration information from a base station, which the time-frequency resource configuration information includes configuration information of measurement time-frequency resources for measuring the cross-link interference, determine the measurement time-frequency resources for measuring the cross-link interference according to the time-frequency resource configuration information, measure the cross-link interference on the measurement time-frequency resources and feed back a measurement result of the cross-link interference to the base station.

Figure 29:
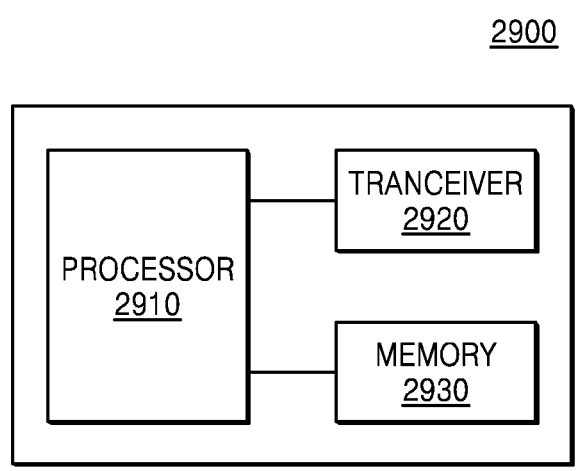
FIG. 29 schematically illustrates a base station according to embodiments of the present disclosure.

FIG. 29 schematically illustrates a base station according to embodiments of the present disclosure.

Referring to the FIG. 29, the base station 2900 may include a processor 2910, a transceiver 2920 and a memory 2930. However, all of the illustrated components are not essential. The base station 2900 may be implemented by more or less components than those illustrated in FIG. 29. In addition, the processor 2910 and the transceiver 2920 and the memory 2930 may be implemented as a single chip according to another embodiment.

The base station 2900 may correspond to the base station 1200 of FIG. 12. Also, the processor 2910 may correspond to the processor 1201 and the memory 2930 may correspond to the memory 1202.

The base station 2900 may correspond to random access preamble allocation apparatus 2600. The base station 2900 may correspond to the random access preamble determination apparatus 2700.

The aforementioned components will now be described in detail.

The processor 2910 may include one or more processors or other processing devices that control the proposed function, process, and/or method. Operation of the base station 2900 may be implemented by the processor 2910.

The transceiver 2920 may include a RF transmitter for up-converting and amplifying a transmitted signal, and a RF receiver for down-converting a frequency of a received signal. However, according to another embodiment, the transceiver 2920 may be implemented by more or less components than those illustrated in components.

The transceiver 2920 may be connected to the processor 2910 and transmit and/or receive a signal. The signal may include control information and data. In addition, the transceiver 2920 may receive the signal through a wireless channel and output the signal to the processor 2910. The transceiver 2920 may transmit a signal output from the processor 2910 through the wireless channel.

The memory 2930 may store the control information or the data included in a signal obtained by the base station 2900. The memory 2930 may be connected to the processor 2910 and store at least one instruction or a protocol or a parameter for the proposed function, process, and/or method. The memory 2930 may include read-only memory (ROM) and/or random access memory (RAM) and/or hard disk and/or CD-ROM and/or DVD and/or other storage devices.

In an embodiment, the processor 2910 configured to configure time-frequency resources for a terminal device, which the time-frequency resources comprise measurement time-frequency resources for measuring the cross-link interference, transmit time-frequency resource configuration information to the terminal device, receive, from the terminal device, a measurement result of cross-link interference measured by the terminal device on measurement time-frequency resources for measuring the cross-link interference determined according to the time-frequency resource configuration information and schedule the terminal device according to the measurement result.

Although the present disclosure has been described with an embodiment, various changes and modifications may be suggested to one skilled in the art. It is intended that the present disclosure encompass such changes and modifications as fall within the scope of the appended claims.

The embodiments of the present disclosure have been described in detail above with reference to the drawings. However, the specific structure is not limited to the above-mentioned embodiments, and the present disclosure also includes any design changes without departing from the spirit of the present disclosure. In addition, various modifications can be made to the present disclosure within the scope of the claims, and the embodiments obtained by appropriately combining the technical means disclosed in different embodiments are also included in the technical scope of the present disclosure. In addition, components having the same effects described in the above embodiments may be replaced with each other.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
   identifying random access preamble related information with respect to a first cell; and
   transmitting, to a base station (BS), a random access preamble via a physical random access channel (PRACH) based on the random access preamble related information,
   wherein the random access preamble related information includes a first value related to the random access preamble for the first cell,
   wherein the first value related to the random access preamble is a same value as a first value to the random access preamble for a second cell, and
   wherein the random access preamble related information with respect to the first cell is identified based on an interference strength between the first cell and the second cell and a strength threshold.

2. The method of claim 1, where the random access preamble related information includes at least one of a zadoff-chu (ZC) sequence length for the first cell, a cyclic shift interval for the first cell, a logical root sequence number for the first cell, or a random access preamble set index number with respect to the first cell, and
   wherein the first value related to the random access preamble corresponds to at least one of the ZC sequence length for the first cell, the cyclic shift interval for the first cell, or the logical root sequence number for the first cell.

3. The method of claim 1,
   wherein the random access preamble is identified based on at least one cyclic shift index corresponding to a first random access preamble set index number with respect to the first cell,
   wherein a random access preamble set index number with respect to the first cell is a different value with a random access preamble set index number with respect to the second cell, and
   wherein the at least one cyclic shift index is identified based on the random access preamble related information with respect to the first cell.

4. The method of claim 1, further comprising:
   receiving, from the BS, a message including a first value corresponding to a number of random access preambles for contention-based random access and a second value corresponding to a number of random access preambles for contention-based random access.

5. The method of claim 1, further comprising:
   receiving, from the BS, information indicating whether data is available to being transmitted or received on an allocated resource,
   wherein the allocated resource is a resource overlapping with a resource related to the random access preamble, and
   wherein the information indicating whether the data is available to being transmitted or received on the allocated resource is received by at least one of downlink control information, a radio resource control (RRC) message, or a system information message.

6. The method of claim 1, wherein the PRACH includes at least one of a pre-guard period, a cyclic prefix of the random access preamble, or a post-guard period, and wherein a sub-carrier space corresponding to the random access preamble is higher than or equal to 1 KHz and lower than or equal to 1.25 KHz.

7. A method performed by a base station (BS) in a wireless communication system, the method comprising:

identifying random access preamble related information with respect to a first cell; and receiving, from a user equipment (UE), a random access preamble via a physical random access channel (PRACH) based on the random access preamble related information, wherein the random access preamble related information includes a first value related to the random access preamble for the first cell, wherein the first value related to the random access preamble is a same value as a first value to the random access preamble for a second cell, and wherein the random access preamble related information with respect to the first cell is identified based on an interference strength between the first cell and the second cell and a strength threshold.

8. The method of claim 7, wherein the random access preamble related information with respect to the first cell is transmitted to the UE, wherein the random access preamble related information includes at least one of a zadoff-chu (ZC) sequence length for the first cell, a cyclic shift interval for the first cell, a logical root sequence number for the first cell, or a random access preamble set index number with respect to the first cell, and wherein the first value related to the random access preamble corresponds to at least one of the ZC sequence length for the first cell, the cyclic shift interval for the first cell, or the logical root sequence number for the first cell.

9. The method of claim 7, wherein the random access preamble is identified based on at least one cyclic shift index corresponding to a first random access preamble set index number with respect to the first cell, wherein a random access preamble set index number with respect to the first cell is a different value with a random access preamble set index number with respect to the second cell, and wherein the at least one cyclic shift index is identified based on the random access preamble related information with respect to the first cell.

10. The method of claim 7, further comprising:

transmitting, to the UE, a message including a first value corresponding to a number of random access preambles for contention-based random access and a second value corresponding to a number of random access preambles for contention-based random access.

11. The method of claim 7, further comprising:

transmitting, to the UE, information indicating whether data is available to being transmitted or received on an allocated resource, wherein the allocated resource is a resource overlapping with a resource related to the random access preamble, and wherein the information indicating whether the data is available to being transmitted or received on the allocated resource is transmitted by at least one of downlink control information, a radio resource control (RRC) message, or a system information message.

12. The method of claim 7, wherein the PRACH includes at least one of a pre-guard period, a cyclic prefix of the random access preamble, or a post-guard period, and wherein a sub-carrier space corresponding to the random access preamble is higher than or equal to 1 KHz and lower than or equal to 1.25 KHz.

13. A user equipment (UE) performed in a wireless communication system, the UE comprising:

a transceiver; and at least one processor coupled to the transceiver and configured to:

identify random access preamble related information with respect to a first cell, and transmit, to a base station (BS), a random access preamble via a physical random access channel (PRACH) based on the random access preamble related information, wherein the random access preamble related information includes a first value related to the random access preamble for the first cell, wherein the first value related to the random access preamble is a same value as a first value to the random access preamble for a second cell, and wherein the random access preamble related information with respect to the first cell is identified based on an interference strength between the first cell and the second cell and a strength threshold.

14. The UE of claim 13, where the random access preamble related information includes at least one of a zadoff-chu (ZC) sequence length for the first cell, a cyclic shift interval for the first cell, a logical root sequence number for the first cell, or a random access preamble set index number with respect to the first cell, and wherein the first value related to the random access preamble corresponds to at least one of the ZC sequence length for the first cell, the cyclic shift interval for the first cell, or the logical root sequence number for the first cell.

15. The UE of claim 13, wherein the random access preamble is identified based on at least one cyclic shift index corresponding to a first random access preamble set index number with respect to the first cell, wherein a random access preamble set index number with respect to the first cell is a different value with a random access preamble set index number with respect to the second cell, and wherein the at least one cyclic shift index is identified based on the random access preamble related information with respect to the first cell.

16. The UE of claim 13, wherein the at least one processor is further configured to:

receive, from the BS, a message including a first value corresponding to a number of random access preambles for contention-based random access and a second value corresponding to a number of random access preambles for contention-based random access.

17. The UE of claim 13, wherein the at least one processor is further configured to:

receive, from the BS, information indicating whether data is available to being transmitted or received on an allocated resource, wherein the allocated resource is a resource overlapping with a resource related to the random access preamble, and wherein the information indicating whether the data is available to being transmitted or received on the allocated resource is received by at least one of downlink control information, a radio resource control (RRC) message, or a system information message.

* * * * *